US 7,042,814 B2

(12) United States Patent
Yamada et al.

(10) Patent No.: US 7,042,814 B2
(45) Date of Patent: May 9, 2006

(54) INFORMATION PLAYBACK APPARATUS

(75) Inventors: Yoichi Yamada, Saitama-ken (JP);
Tomohiko Kimura, Saitama-ken (JP);
Koichiro Sakata, Saitama-ken (JP);
Takeaki Funada, Saitama-ken (JP);
Hiroyuki Isobe, Saitama-ken (JP);
Junichi Takagaki, Saitama-ken (JP);
Tetsuya Kikuchi, Saitama-ken (JP);
Gen Inoshita, Tokyo (JP); Ko Atsumi,
Tokyo (JP)

(73) Assignee: Pioneer Corporation, Tokyo (JP)

( * ) Notice: Subject to any disclaimer, the term of this patent is extended or adjusted under 35 U.S.C. 154(b) by 456 days.

(21) Appl. No.: 10/150,995

(22) Filed: May 21, 2002

(65) Prior Publication Data
US 2002/0172107 A1   Nov. 21, 2002

(30) Foreign Application Priority Data
May 21, 2001   (JP) .............................. 2001-150928

(51) Int. Cl.
*G11B 7/085* (2006.01)
*G10H 7/00* (2006.01)

(52) U.S. Cl. .................... 369/30.26; 84/605; 84/636
(58) Field of Classification Search ............. 369/30.28, 369/30.1, 30.26; 84/605, 636; G11B 7/085; G10H 7/00, G10H 1/40
See application file for complete search history.

(56) References Cited
U.S. PATENT DOCUMENTS
5,245,663 A   9/1993  Green .......................... 381/61

| 5,350,882 A * | 9/1994 | Koguchi et al. ............... 84/636 |
| 5,512,704 A | 4/1996 | Adachi ......................... 84/605 |
| 6,434,100 B1 * | 8/2002 | Usui ......................... 369/53.31 |
| 6,535,462 B1 * | 3/2003 | Liu ............................... 369/4 |
| 6,541,690 B1 * | 4/2003 | Segers, Jr. .................... 84/605 |
| 6,590,840 B1 * | 7/2003 | Inoue et al. ............. 369/30.27 |
| 6,751,167 B1 * | 6/2004 | Yamada et al. .......... 369/30.19 |

FOREIGN PATENT DOCUMENTS

| EP | 0 977 171 A1 | 2/2000 |
| JP | 11086447 A * | 3/1999 |
| JP | 11213520 A * | 8/1999 |
| WO | WO 97/01168 | 1/1997 |
| WO | WO 00/21090 | 4/2000 |

OTHER PUBLICATIONS
*Abstract Only* of JP 06 089501, Mar. 29, 1994, Iizuka Norio.

* cited by examiner

Primary Examiner—A M Psitos
(74) Attorney, Agent, or Firm—Arent Fox PLLC

(57) ABSTRACT

An information playback apparatus is provided to obtain editing effects using an optical disc in the same sense as an analog record disc is manipulated. An audio editing apparatus for playing back an optical disc such as a CD is provided with a rotatable jog dial, detecting device for detecting the amount of rotation of the jog dial, and sensing device for sensing the presence or absence of a pressing force on the jog dial. When the jog dial is rotated while being depressed with a predetermined pressing force, processing for providing sound effects is performed on the playback data to be played back from the optical disc in response to the amount of rotation detected by the detecting device. It is thereby possible to provide the same feeling of operation as provided by rotating an analog record disc through hand operations to produce playback sounds.

5 Claims, 13 Drawing Sheets

ANALOG RECORD

INFORMATION PLAYBACK APPARATUS

BACKGROUND OF THE INVENTION

The present invention relates to an information playback apparatus for providing playback of audio information such as music or sound in conjunction with editing effects.

The present application claims priority from Japanese Application No. 2001-150928, the disclosure of which is incorporated herein by reference for all purposes.

For playback of analog record discs such as LPs with analog record players, conventional performance techniques are known which provide various editing effects for playback of sounds by forcefully changing the rotational direction and speed of the analog record disc through hand operations.

For example, a producer called a disc jockey may be seen such as in discotheques who touches an analog record disc during playback with an analog record player in order to forcefully rotate the disc at an rpm different from the one originally intended for the disc in the forward or reverse rotational direction. The producer thereby produces an imitation sound called a scratching sound (an imitation sound, such as "squeaking" and "rattling").

On the other hand, storage media such as CDs (Compact Disc) or DVDs (Digital Versatile Disc), on which information is stored in digital form, have come into actual use as the digital technology moves forward. It is now therefore difficult to provide such editing effects for those storage media through the same hand operations as for the conventional analog record disc.

That is, in the case of the analog record disc, audio signals such as music are allowed to remain unchanged to be continuously stored along the record track, thus making it possible to establish one to one correspondences between the position of the analog record disc to be read (or scanned) with a record stylus and the sound to be read. It is therefore possible to provide editing effects through hand operations as desired.

However, in the case of storage media such as CDs or DVDs on which information is stored in digital form, a special digital technology is employed to record or read the information which cannot be made known to human sense by intuition. For example, it is not possible to provide editing effects as desired for a CD during playback with a CD player even through the hand operations as for the analog record disc.

In particular, it is stipulated in the standards for CD or DVD players that their optical read device or pickup is to read information and play back the sound while the CD or DVD is being rotated in the predetermined rotational direction with respect to the pickup. Thus, it is not standardized that information is to be read in the reverse order to play back the sound while the CD or DVD is being rotated in the reverse rotational direction with respect to the pickup. Accordingly, turning the CD or DVD merely in the direction opposite to the predetermined direction through hand operations would cause information to be improperly read and played back, thereby making it impossible to produce an imitation sound called a scratching sound.

SUMMARY OF THE INVENTION

The present invention has been developed in view of the aforementioned conventional problems. It is therefore an object of the present invention to provide an information playback apparatus which enables obtaining editing effects using a storage medium such as a CD or DVD, on which information is stored in digital form, in the same sense as an analog record disc is manipulated.

In order to achieve the aforementioned object, the present invention provides an information playback apparatus which controls an amount of playback information. The information playback apparatus according to the present invention is characterized by comprising a rotating body provided rotatably; detecting device for detecting an amount of rotation of the rotating body; sensing device for sensing a pressure on or a contact with the rotating body; and control device for setting the amount of the playback information in response to the amount of rotation detected by the detecting device when the sensing device has detected a pressure on or a contact with the rotating body.

Suppose that the playback information is audio information. In this case, the aforementioned configuration allows for setting the amount of playback of the audio information in response to the amount of rotation of the rotating body in order to provide playback. For example, when a user rotates the rotating body through hand operations, this makes it possible to provide just the same feeling of operation as provided by rotating an analog record disc through hand operations to set audio playback information.

Furthermore, the present invention is characterized by further comprising editing device for performing editing processing to provide a sound effect for playback information, the information having the amount set by the control device.

Suppose also that the playback information is audio information. In this case, the aforementioned configuration allows for setting the amount of playback of the audio information in response to the amount of rotation of the rotating body in order to provide playback. For example, when the user rotates the rotating body through hand operations, this makes it possible to provide just the same feeling of operation as provided by rotating an analog record disc through hand operations to provide sound effects for audio playback information.

Furthermore, the present invention is characterized in that when the control device determines from the amount of rotation detected by the detecting device that the rotating body is at rest, the control device stops the editing processing provided by the editing device.

The aforementioned aspect of the invention makes it possible to provide just the same feeling of operation as provided by forcefully stopping an analog record disc through hand operations if the user only touches the rotating body without rotating it.

Furthermore, suppose that the control device determines from the amount of rotation detected by the detecting device that the rotating body is being rotated back and forth in forward and reverse rotational directions. In this case, the present invention is characterized in that the control device causes the editing device to perform editing processing for providing the playback information with a sound effect in a forward direction in response to the amount of rotation in the forward rotational direction. The control device also causes the editing device to perform editing processing for providing the playback information with a sound effect in a reverse direction in response to the amount of rotation in the reverse rotational direction.

According to the aforementioned aspect of the invention, when the user rotates the rotating body back and forth in the forward and reverse rotational directions, performed is the editing processing which provides sound effects in the forward and reverse directions in response to the amount of rotation in the forward and reverse rotational directions, respectively. For example, suppose that the playback information is audio information. In this case, this allows for playing back scratching sounds, thereby providing just the same feeling of operation as provided by the user rotating an analog record disc back and forth in the forward and reverse rotational directions to produce scratching sounds.

Furthermore, the present invention is characterized by further comprising display device for indicating the amount of rotation of the rotating body in response to the amount of rotation detected by the detecting device.

For example, in the case where the playback information is audio information, the aforementioned configuration allows the user to merely look at the display on the display device to thereby obtain just the same feeling of operation as provided by looking at the movement of an analog record disc rotated by the user.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Now, an information playback apparatus according to the present invention will be explained below with reference to the accompanying drawings in accordance with the embodiment. Incidentally, the information playback apparatus according to the embodiment can provide various editing effects for playback of information and is thus hereinafter referred to as the audio editing apparatus.

Figure 1:
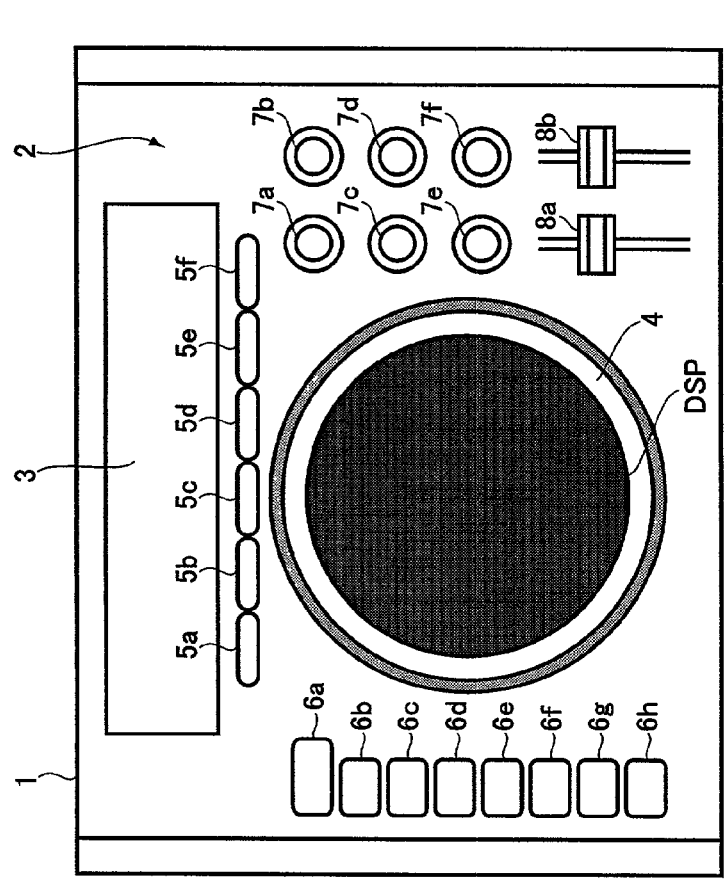
FIG. 1(a) through 1(c) are views illustrating the outer configuration of an audio editing apparatus according to an embodiment.
Figure 1:
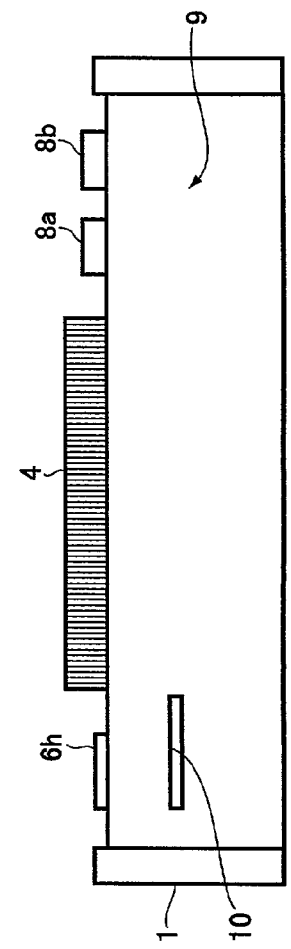
Figure 1:
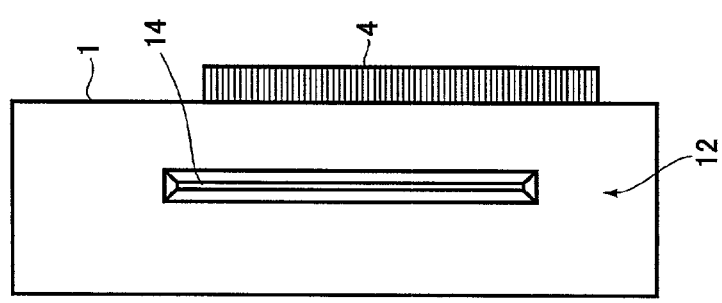

FIGS. 1(a) through 1(c) are views illustrating an outward appearance of an audio editing apparatus 1. FIG. 1(a) is a front view, FIG. 1(b) is a side view when viewed from the front, and FIG. 1(c) is a side view when viewed from a sideway.

In FIG. 1(a), a manipulation surface 2 mounted on the case of the audio editing apparatus 1 is provided with a display unit 3 composed of a liquid crystal display; a rotatable disc-wise jog dial 4; a plurality of manipulation keys 5a–5f and 6a–6h consisting of push-pull switches; a plurality of manipulation keys 7a–7f comprising a rotatable rotary switch or a rotatable variable resistor; and a plurality of manipulation keys 8a, 8b comprising a variable resistor of a sliding type. The manipulation keys 5a–5f, 6a–6h, 7a–7f, 8a, and 8b constitute a manipulation unit 30, described later.

As shown in FIG. 1(b), the case of the audio editing apparatus 1 is provided on its front side 9 with a memory card slot 10 having a slit-shaped opening into which a memory card incorporating a semiconductor memory is detachably inserted. As shown in FIG. 1(c), the case of the audio editing apparatus 1 is also provided on its side surface 12 with a slit-shaped disc inlet 14 into which a CD or DVD (hereinafter referred to as an optical disc) is detachably inserted.

When an optical disc is inserted into the disc inlet 14, the optical disc causes an automatic loading mechanism (not shown), provided inside the disc inlet 14, to be automatically initiated to transfer the optical disc to a clamping position located generally under the jog dial 4. The optical disc is thus loaded onto a hub unit (not shown) provided on the drive shaft of a spindle motor 16 which will be described later. When the manipulation key 5a for providing an instruction for starting or stopping playback is depressed, the spindle motor then starts rotating in the predetermined direction, thereby allowing a disc playback unit 15 (see FIG. 5), described later, to play back information (hereinafter referred to as data) stored on the optical disc.

When the depressed manipulation key 5a is depressed again, the spindle motor 16 stops its rotation as well as the disc playback unit 15 stops the playback of the optical disc. When the manipulation key 5b called an eject button is depressed, the aforementioned automatic loading mechanism is brought into an unloading state to transfer the optical disc located at the clamping position out of the disc inlet 14.

The jog dial 4 is provided to variably set a playback speed and a playback direction for the disc playback unit 15 to read data stored on the optical disc and thereby provide playback of the sound.

Prior to the description of the configuration of the jog dial 4, which will be described later, the functionality of the jog dial 4 is now explained below.

When a user varies the rotational direction and speed of the jog dial 4 through hand operations, it is possible to set the forward playback and the reverse playback in response to the rotational direction. It is also possible to change the tune of sounds to be played back with a speaker or headphone in response to the rotational speed of the jog dial 4.

What is meant by the aforementioned forward playback is to provide playback of data in the order of streams as stored on an optical disc in the same way as an analog record disc such as an LP is rotated in the forward rotational direction to play back music or the like. The disc playback unit 15 is thus adapted to provide forward playback of music or the like as the playback of ordinary sounds in response to the jog dial 4 manipulated to rotate in the clockwise direction. The disc playback unit 15 is also adapted to provide forward playback even when the jog dial 4 is not manipulated and thus is at rest.

What is meant by the aforementioned reverse playback is to provide playback of data in the reverse order of streams as stored on an optical disc, in the same way as an analog record disc such as an LP is rotated in the reverse rotational direction to play back music or the like. An analog record disc has music or the like stored continuously (or in analog form) thereon. Accordingly, rotating the analog record disc in the reverse rotational direction provides playback of the music or the like in the reverse direction, thereby playing back imitation sounds different from the original music or the like. However, when the jog dial 4 is manipulated to rotate in the counterclockwise direction, the disc playback unit 15 plays back in the reverse stream direction individual data stored in digital form on an optical disc. Thus, the disc playback unit 15 is adapted to thereby produce imitation sounds in the same manner as an analog record disc is rotated in the reverse rotational direction to provide playback.

However, the disc playback unit 15 does not rotate the optical disc itself in the reverse rotational direction but provides the same effect as provided by rotating an analog record disc in the reverse rotational direction.

As described above, the disc playback unit 15 is provided with the same function as provided by rotating an analog record disc in the reverse rotational direction. Accordingly, for example, when a user such as a performer or a so-called disc jockey rotates the jog dial 4 back and forth in the clockwise and counterclockwise directions through hand operations, it is possible to produce an imitation sound called a scratching sound (an imitation sound, such as "squeaking" and "rattling"). Furthermore, manipulating the jog dial 4 to produce the scratching sounds makes it possible to perform edits for producing rap music using an optical disc.

On the other hand, the manipulation keys 5c, 5d, 5e are called cue buttons. When the user depresses the manipulation key 5c during playback of an optical disc, a system controller 29 (which will be described later), stores an elapsed track time of the time of the playback as history information. Furthermore, each time the manipulation key 5c is depressed, the elapsed track time of the time of each playback is stored as history information, thereby making it possible to store the elapsed track time of a plurality of times of playback.

When the user depresses the manipulation key 5d, the history information stored in the system controller 29 is displayed on the display unit 3. When the user further depresses the manipulation key 5e, the history information (i.e., elapsed track time) displayed on the display unit 3 is located to initiate playback. Each time the manipulation key 5d is depressed, the history information stored in the system controller 29 is sequentially displayed on the display unit 3. Thus, the user can manipulate the manipulation keys 5c, 5d, 5e as appropriate, thereby making it possible to locate the desired elapsed track time and then initiate playback.

The disc playback unit 15 is adapted to play back sub-code data stored as control data on an optical disc to determine the aforementioned elapsed track time from Q-channel code data contained in the sub-code data.

The manipulation key 5f is designed to provide the disc playback unit 15 with an instruction for initiating effects processing. The disc playback unit 15 initiates the effects processing when the user depresses the manipulation key 5f, while terminating the effects processing when the user depresses the manipulation key 5f again.

Although the remaining manipulation keys 6f–6h will not be further detailed, the keys are designed for the user to selectively specify the various functions available on the audio editing apparatus 1.

The manipulation keys 7a–7f are designed to provide the disc playback unit 15 with an instruction for performing various effects processing on playback of data. The user can change the rotational angle of each of the manipulation keys 7a–7f, thereby specifying the method of the effects processing.

Now, as a typical example, the function of the manipulation keys 7a, 7b is explained below. Both the manipulation keys 7a, 7b are made up of a rotary switch which can be changed in three levels by the user as appropriate. The levels include "the first level" and "the second level", which are provided to specify the method of the effects processing, and "the OFF level" which is provided between the first and second levels to release the effects processing.

When the manipulation key 7a is switched to "the first level", the disc playback unit 15 modulates playback data with a saw-tooth wave. When the manipulation key 7a is switched to "the second level", the disc playback unit 15 modulates playback data with a rectangular wave, thereby performing the effects processing. When the manipulation key 7b is switched to "the first level", the disc playback unit 15 modulates playback data to provide it with the Doppler effect. When the manipulation key 7b is switched to "the second level", the disc playback unit 15 modulates the playback data with a specific waveform analogous to the sound of a jet plane. When the manipulation keys 7a, 7b are switched to "the OFF level", the disc playback unit 15 releases the modulation processing.

As described above, when the user switches the manipulation keys 7a–7f as appropriate, it is possible to perform the effects processing to provide an original playback sound with various sound effects. Furthermore, when the jog dial 4 is hand-operated to change the rotational direction and speed in various ways, it is possible to provide more various combinations of effects processing using the manipulation keys 7a–7f and the jog dial 4.

The manipulation key 8a is designed to control the volume of playback sounds which are delivered from a speaker or headphone. In response to the amount of manipulation on the manipulation key 8a, the volume is adjusted by controlling the gain of a power amplifier (not shown) which is provided in an audio signal generating unit 27 of FIG. 5. The manipulation key 8a is pushed away from the user to increase the volume, whereas pulled toward the user to decrease the volume.

The manipulation key 8b is designed to control the tone of playback sounds which are delivered from a speaker or headphone. That is, pushing the manipulation key 8b away from the user causes the tempo of a playback sound to increase in response to the amount of the push. On the other hand, pulling the manipulation key 8b toward the user causes the tempo of the playback sound to decrease in response to the amount of the pull. In other words, in response to the amount of manipulation of the manipulation key 8b, the playback sound is played in fast or slow forward and thereby the tempo of the playback sound can be changed.

Figure 5:
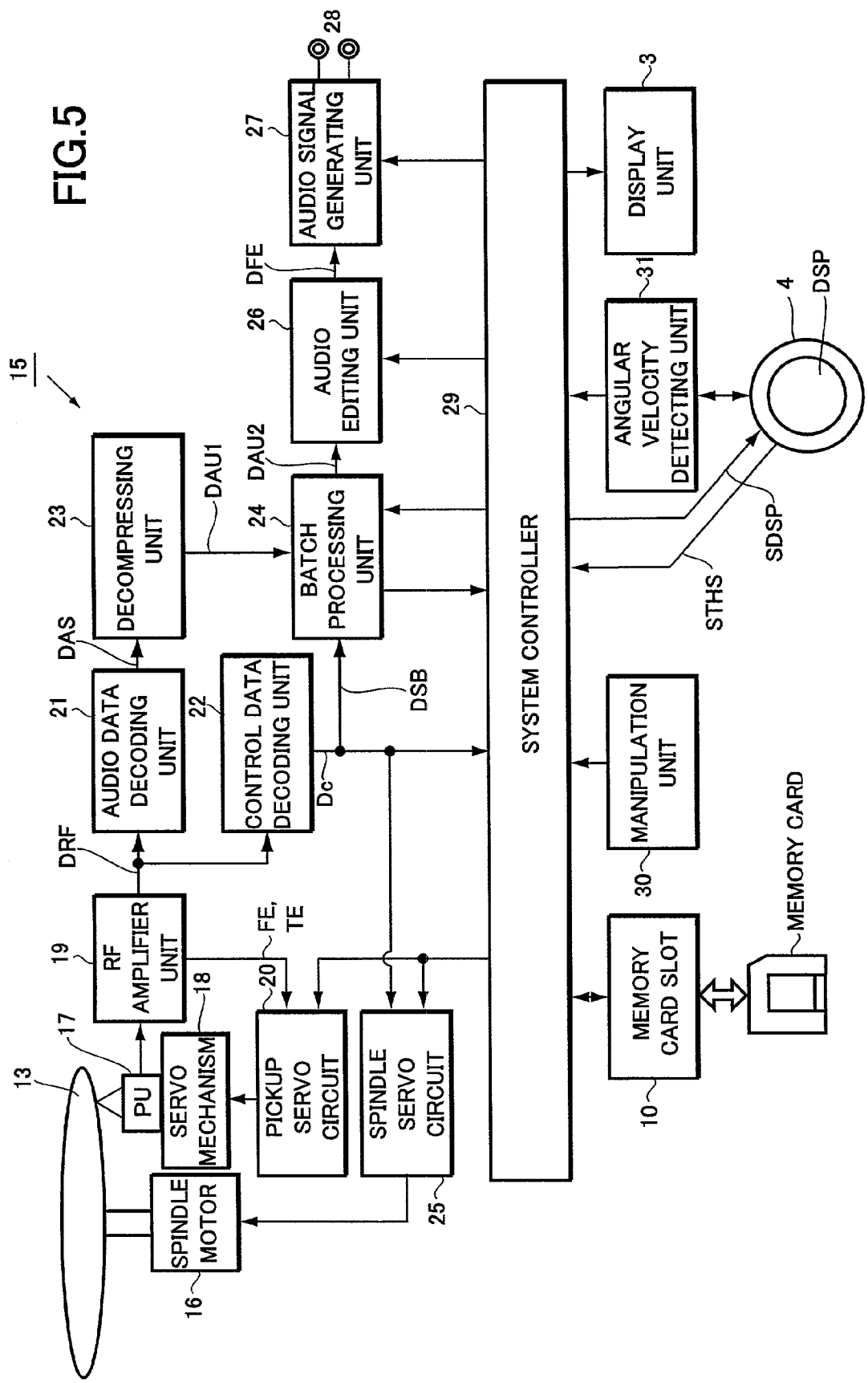
FIG. 5 is a block diagram illustrating a configuration of a disc playback unit provided in the audio editing apparatus.

The control of the tempo of a playback sound is implemented by adjusting the timing for retrieving the playback data from a ring buffer memory 32 (see FIG. 6) which is provided in a batch processing unit 24 of FIG. 5. That is, multiple pieces of data are retrieved from an optical disc and then temporarily stored as playback data in the ring buffer memory 32. Then, the timing for reading the playback data from the ring buffer memory 32 is adjusted in response to the amount of manipulation on the manipulation key 8b, thereby controlling the tempo of the playback sound.

When the manipulation key 8b is pushed away from the user, the data are read at short time intervals according to the amount of manipulation, whereas the data are read at long time intervals according to the amount of manipulation when the manipulation key 8b is pulled toward the user.

The playback data which have been read as described above in response to the amount of manipulation on the manipulation key 8b are supplied to the audio signal generating unit 27 through an audio editing unit 26. The playback data are then converted from digital to analog at the predetermined sampling frequency by the D/A converter (not shown) provided in the audio signal generating unit 27, and then the resulting data are supplied to the aforementioned power amplifier. In this case, the sampling rate of the aforementioned D/A converter is substantially changed, thereby changing the tempo of the playback sound which is delivered from the power amplifier and then played back by a speaker or headphone.

On the upper surface of the jog dial 4 shown in FIG. 1(a), a display unit DSP, which is generally circular in shape and called a "rotation indicator", is integrated with the jog dial 4.

Figure 2:
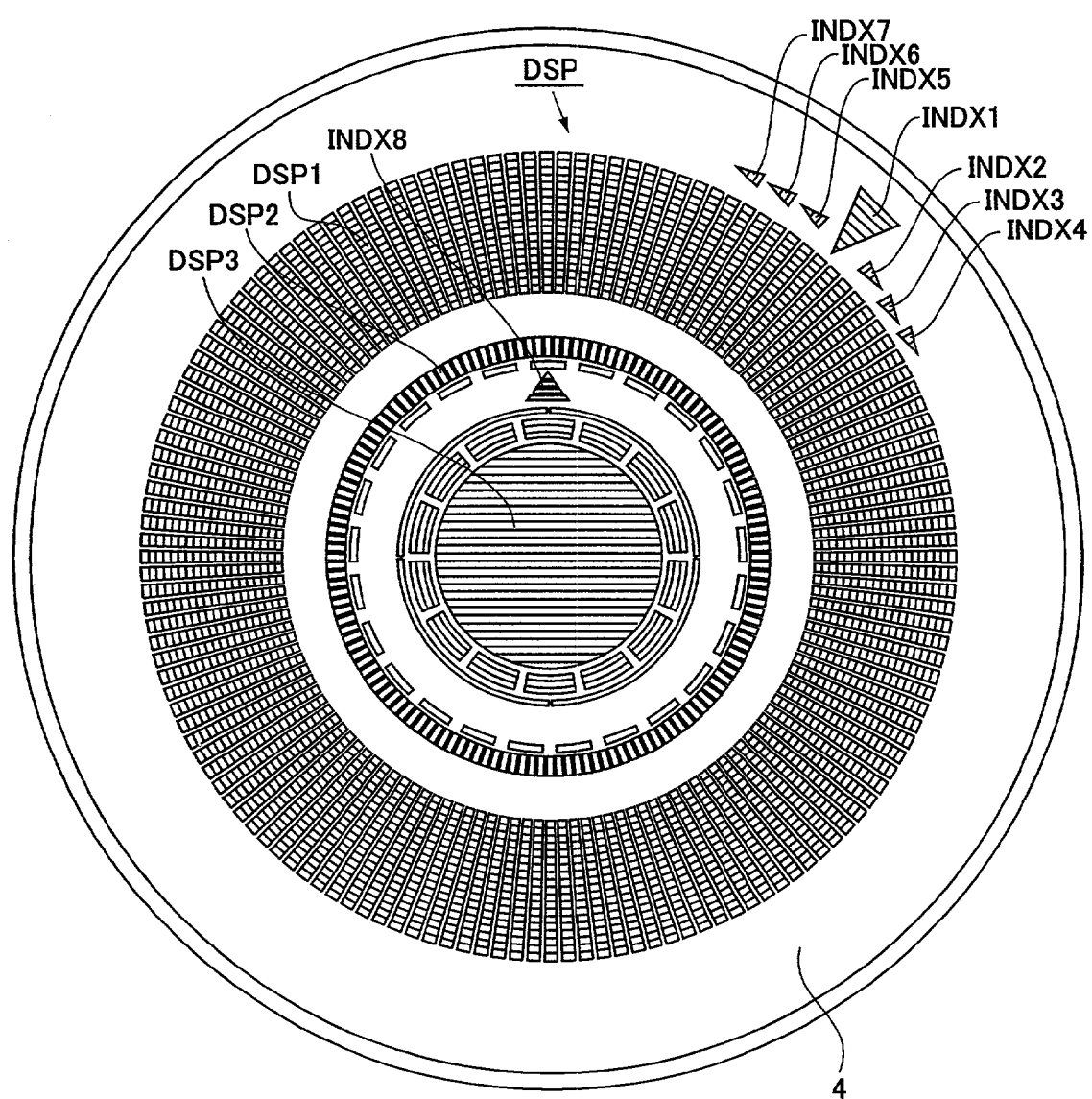
FIG. 2 is a plan view illustrating the shape of a rotation indicator which is formed on the upper surface of a jog dial provided in the audio editing apparatus.

The rotation indicator DSP is made up of a color liquid crystal display and comprises a first display unit DSP1, a second display unit DSP2, a third display unit DSP3, and a fourth display unit DSP4. As shown in FIG. 2, the first display unit DSP1 is formed of a plurality of fine rectangular light-emitting cells disposed in the shape of rings. The second display unit DSP2 is formed of a plurality of fine rectangular light-emitting cells disposed in the shape of a ring inside the first display unit DSP1. The third display unit DSP3 is formed in the shape of a circle inside the second display unit DSP2. The fourth display unit DSP4 is provided in close proximity to the inside of the second display unit DSP2.

Furthermore, at predetermined portions outside the first display unit DSP1, provided are a plurality of triangular index display units INDX1–INDX7. There is also provided a triangular index display unit INDX8 at a predetermined portion between the second display unit DSP2 and the third display unit DSP3.

Now, referring to FIGS. 3(a) through 3(c), the display format of the rotation indicator DSP is explained below.

First, described is the display format of the first display unit DSP1 and the index display units INDX1–INDX7 in contrast with the operation of playing back analog codes with an analog record player.

As schematically shown in FIG. 3(a), an analog record disc is placed on a turntable of an analog record player and then a read arm ARM is placed on the analog record disc to initiate playback. Then, the analog record disc rotates in the forward rotational direction along the arrow θf (in the clockwise direction).

In the audio editing apparatus 1, the index display unit INDX1 shown in FIG. 3(b) is lit when the user manipulates the manipulation key 5a to give an instruction for initiating playback of the optical disc. The index display unit INDX1 is provided at a predetermined angular position of the rotation indicator DSP so as to imitate the position at which the record stylus PIN provided at the tip of the read arm ARM, shown in FIG. 3(a), is in contact with the analog record disc.

Accordingly, when the user looks at the index display unit INDX1, the user can obtain a feeling of operation as provided by playing back the analog record disc with the record stylus PIN.

As shown in FIG. 3(b), of the multiple display cells forming the first display unit DSP1, only those multiple display cells are lit which are located within a relatively narrow angle in the circumferential direction. The multiple display cells which are lit define a rotation indicating region X formed in the shape of a sector, causing the remaining display cells to be unlit.

With the jog dial 4 at rest, the rotation indicating region X moves in the direction of the arrow θf (in the clockwise direction) of FIG. 3(b) in accordance with the playback speed of playback sounds which is specified for each optical disc. Suppose that the playback speed of playback sounds which is specified for each optical disc is Vf. In this case, the playback speed Vf is converted to the regular playback speed of an LP record disc or 33 rpm, and the rotation indicating region X moves in the direction of the arrow θf at the converted speed.

In other words, the rotation indicating region X shown in FIG. 3(b) also moves in the clockwise direction θf at 33 rpm in the same way as the analog record disc rotates in the forward rotational direction θf at 33 rpm as shown in FIG. 3(a). Accordingly, the user merely looks at the rotation indicating region X, which rotates along the annular first display unit DSP1, to obtain just the same feeling of operation as provided by looking at a rotating analog record disc.

Then, when the user rotates the jog dial 4 shown in FIG. 3(b) in the clockwise direction θf through hand operations while applying a predetermined pressing force to the jog dial 4, the rotation indicating region X also moves in the clockwise direction θf at the same speed as the rotational speed. In other words, the rotation indicating region X moves in the clockwise direction θf at the same angular velocity as that of the jog dial 4.

Accordingly, the user rotates the jog dial 4 in the clockwise direction θf through hand operations to look at the rotation indicating region X which moves in the clockwise direction θf in response to the amount of the hand operations. This allows the user to obtain the same feeling of operation as provided by rotating an analog record disc through hand operations at a desired speed in the forward rotational direction θf as shown in FIG. 3(a).

Then, when the user rotates the jog dial 4 shown in FIG. 3(b) in the counterclockwise direction θr through hand operations while applying a predetermined pressing force to the jog dial 4, the rotation indicating region X also moves in the counterclockwise direction θr at the same speed as the rotational speed. In other words, the rotation indicating region X moves in the counterclockwise direction θr at the same angular velocity as that of the jog dial 4.

Accordingly, the user rotates the jog dial 4 in the counterclockwise direction θr through hand operations to look at the rotation indicating region X which moves in the counterclockwise direction θr in response to the amount of the hand operations. This allows the user to be provided with the same feeling of operation as provided by rotating an analog record disc through hand operations at a desired speed in the reverse rotational direction θr as shown in FIG. 3(a).

Figure 3:
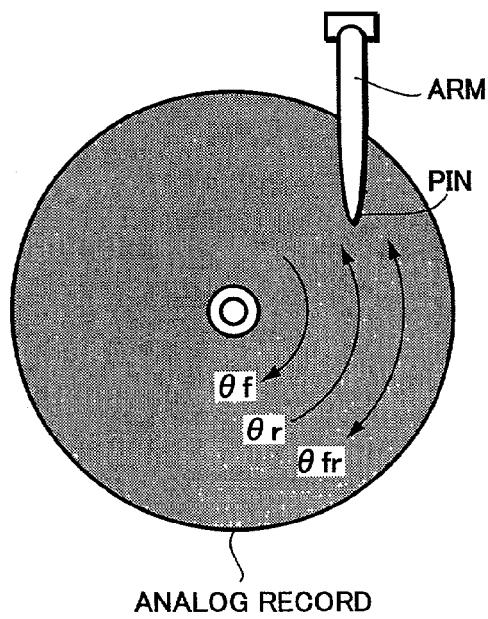
FIG. 3(a) through 3(c) are explanatory views illustrating the display format of the rotation indicator.
Figure 3:
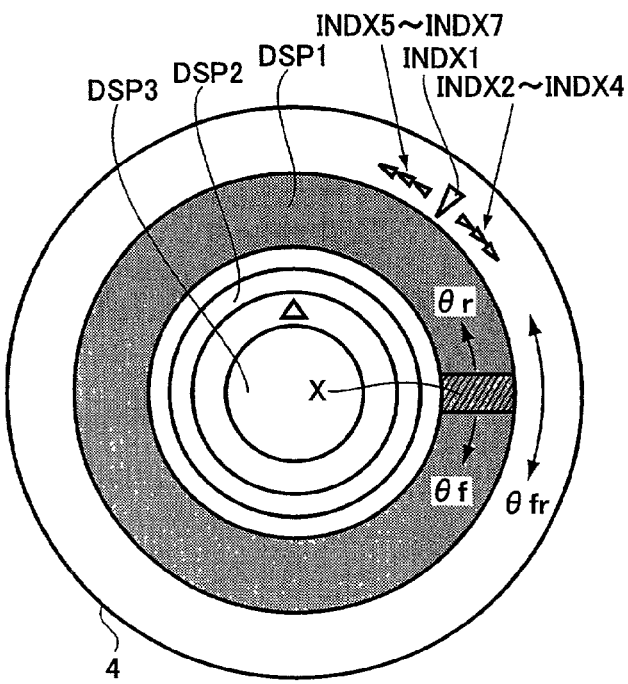
Figure 3:
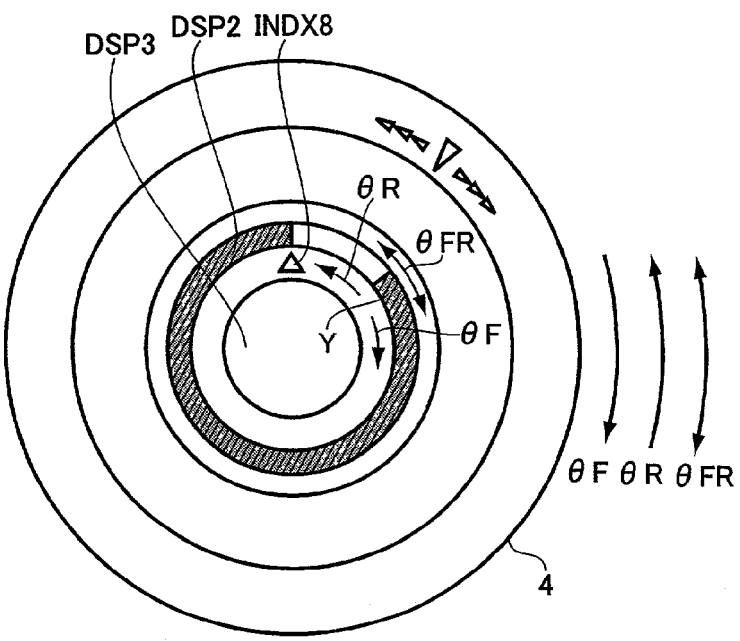

Then, as shown by the bi-directional arrow θfr in FIG. 3(b), when the user rotates the jog dial 4 back and forth in the clockwise and counterclockwise directions through hand operations while applying a predetermined pressing force to the jog dial 4, the rotation indicating region X also moves back and forth in the clockwise and counterclockwise directions in accordance with the angular velocity and the amount of rotation in the respective rotational directions. Accordingly, the user may rotate the jog dial 4 back and forth in bi-directions θfr and look at the rotation indicating region X which moves in the clockwise and counterclockwise directions θfr in response to the amount of the back and forth operation. This allows the user to be provided with the same feeling of operation as provided by rotating an analog record disc back and forth through hand operations in the forward and reverse rotational directions θfr as shown in FIG. 3(*a*).

Now, described below are the index display units INDX2 –INDX7. When the user rotates the jog dial 4 through hand operations with a force less than the predetermined pressing force, the index display units INDX2 –INDX7 are lit in response to the amount of the operation.

More specifically, for example, during playback of an analog record disc with an analog record player, a disc jockey may momentarily touch the turntable rotating at a predetermined rpm, with the analog record disc being loaded thereon, to apply an external force to the table for a short period of time. Thus, the disc jockey may perform operations for rotating the turntable in the forward rotational direction at an rpm higher than the predetermined rpm or at an rpm lower than the predetermined rpm. These operations are called "bit bend" or a technique used to make fine adjustments of the contact position of a record stylus with an analog record disc. For example, suppose music is played back on two analog record players, and fine adjustments are made in order to align the phase of the music which is played back on one player with that of the music which is played back on the other player (i.e., to align the tempo of the music from the one player with that of the music from the other player). In some cases, the disc jockey may perform the bit bend on one of the two analog record players, thereby presenting the two pieces of music, which are played back with two analog record players, without causing the listener to feel differently.

While the jog dial 4 is at rest without being touched by the user, the disc playback unit 15 according to this embodiment provides playback of sounds at the predetermined rate which is specified for each optical disc and then supplies the sounds to a speaker. When the jog dial 4 at rest is rotated momentarily with a relatively weak force through hand operations in the clockwise or counterclockwise direction, the disc playback unit 15 provides the same effects as the aforementioned "bit bend".

Consider the case where the jog dial 4 is rotated momentarily with a relatively weak force through hand operations in the clockwise or counterclockwise direction. In this case, the disc playback unit 15 causes playback to jump to the previous or subsequent elapsed track time with respect to the current position of a playback sound in response to the direction and amount of the rotation of the jog dial 4. Thus, playback of the sound is restarted from the position of the elapsed track time to which the playback has been jumped, thus allowing the same fine adjustments as the aforementioned bit bend.

When the bit bend is performed on the jog dial 4, the index display units INDX2 –INDX7 are lit in response to the direction and amount of the rotation of the jog dial 4 in order to let the user know about the bit bend.

When the jog dial 4 is subjected to the bit bend in the clockwise direction, the index display units INDX2 –INDX4 which are each formed in the shape of a triangle in the clockwise direction θf are lit, whereas the index display units INDX5 –INDX7 which are each formed in the shape of a triangle in the counterclockwise direction θr are unlit. On the other hand, when the jog dial 4 is subjected to the bit bend in the counterclockwise direction, the index display units INDX2 –INDX4 which are each formed in the shape of a triangle in the clockwise direction θf are unlit, whereas the index display units INDX5 –INDX7 which are each formed in the shape of a triangle in the counterclockwise direction θr are lit.

In addition, in response to the amount of rotation of the jog dial 4 in the clockwise direction, the number of lit and unlit portions of the three index display units INDX2 –INDX4 is set to thereby provide barcode display in three levels. On the other hand, in response to the amount of rotation of the jog dial 4 in the counterclockwise direction, the number of lit and unlit portions of the three index display units INDX5 –INDX7 is set to thereby provide barcode display in three levels.

Now, referring to FIG. 3(*c*), described below are the display format of the second display unit DSP2 and the index display unit INDX8.

The index display unit INDX8 is lit to display the head position of the data stored on an optical disc. The second display unit DSP2 displays in an analog form the data stored on the optical disc in terms of two amounts of data with respect to the position of the index display unit INDX8: one is the amount of data which has been played back as playback sounds until the current point in time and the other is the amount of remaining data which has not yet been played back.

For example, suppose the optical disc has stored thereon an amount of data for a period of 47 minutes. In this case, immediately after playback has been started, all the light-emitting cells forming the second display unit DSP2 are lit, thereby allowing the second display unit DSP2 to be lit in the shape of a ring. When playback has been completed in one minute, the light-emitting cells which correspond to the one minute with respect to the index display unit INDX8 are unlit. When playback has been completed in two minutes, the light-emitting cells which correspond to the two minutes are unlit. In this way, as the elapsed track time proceeds, the number of unlit light-emitting cells is increased, thereby displaying in an analog form the amount of data which has been played back as playback sounds until the current point in time. On the other hand, a sector display region Y remains unlit in the shape of a sector, thereby displaying in an analog form the amount of remaining data which has not yet been played back.

In accordance with the Q-channel data in the sub-code data DSB stored on the optical disc, the elapsed track time indicative of playback elapsed time is detected, thereby displaying in an analog form the amount of data which has been played back as playback sounds until the current point in time and the amount of remaining data which has not been played back.

Suppose that the jog dial 4 is rotated in the counterclockwise direction θR or in bi-directions θFR to thereby change the point of playback of playback sounds in time. In this case, in response to the amount of operation on the rotation, the length of the sector display region Y is changed in real time. Even in this case, in accordance with the Q-channel data in the sub-code data DSB, the elapsed track time is detected to thereby provide suitable display.

Now, the third display unit DSP3 is a general-purpose display region for displaying thereon a given piece of information. For example, the region is used to display information characteristic of the optical disc or the situation of operation of the audio editing apparatus 1.

In addition, the fourth display unit DSP4 is disposed in close proximity to the inside of the display unit DSP shown in FIG. 2 or in the shape of a thin ring formed of light-emitting cells which are arrayed in the shape of a broken line. The fourth display unit DSP4 is lit when the user applies a predetermined pressing force to the jog dial 4 whereas unlit when the user puts off his/her hand from the jog dial 4 or puts on the hand thereon with a force weaker than the predetermined pressing force upon the aforementioned bit bend. As described above, the fourth display unit DSP4, which is annular in shape and thin, is lit or unlit, thereby providing the user with an appropriate feeling of operation on the jog dial 4.

Incidentally, the system controller 29 to be described later is designed to control the rotation indicator DSP to provide display, which will be detailed later.

Figure 4:
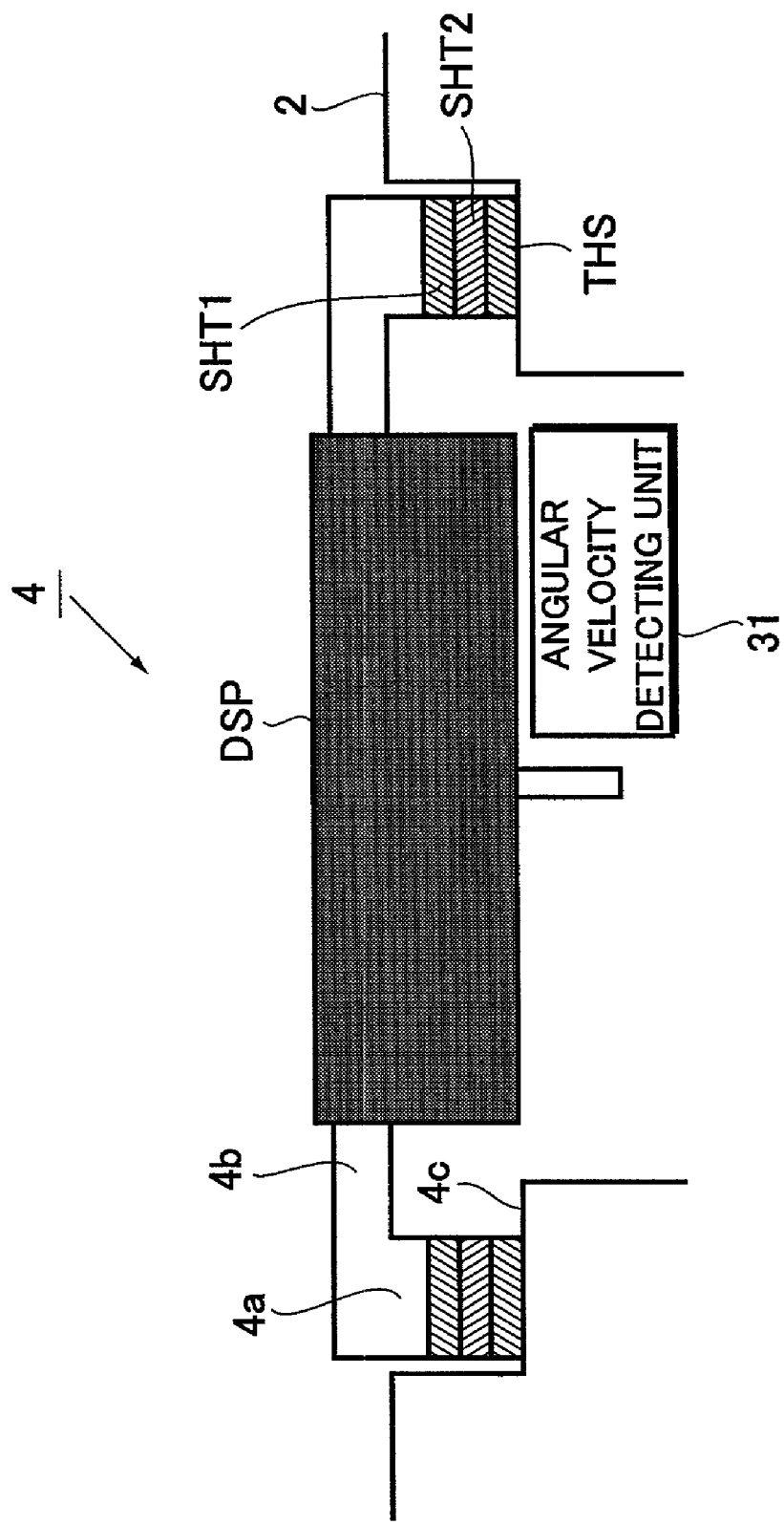
FIG. 4 is a longitudinal sectional view illustrating the configuration of the jog dial.

Now, the configuration of the jog dial 4 is described below with reference to FIG. 4. FIG. 4 is a longitudinal sectional view taken along the center of rotation of the jog dial 4.

A cylindrical outer circumference portion 4a and an annular top portion 4b are integrated into the jog dial 4 through plastic molding. The rotation indicator DSP formed of a liquid crystal display is integrally fixed onto the center portion of the top portion 4b. The outer circumference portion 4a is accommodated slidably in a cylindrical depressed sectional portion 4c provided on the case.

Furthermore, an annular seal member SHT1, which is formed in the shape of a plate to the shape of the bottom surface of the outer circumference portion 4a, is affixed to the annular bottom surface of the outer circumference portion 4a. The seal member SHT1, an annular pressure sensing layer THS having the same shape as that of the seal member SHT1, and an annular thin-plate-shaped seal member SHT2 having the same shape as that of the seal member SHT1 are affixed in layers to the upper surface of the depressed sectional portion 4c closer to the case. Here, the seal members SHT1, SHT2 are formed of plastics which are slippery with respect to each other.

That is, with the seal member SHT1 affixed to the bottom surface of the outer circumference portion 4a being slidably in contact with the seal member SHT2 affixed to the depressed sectional portion 4c, the jog dial 4 is accommodated in the depressed sectional portion 4c, thereby making the jog dial 4 slidable with respect to the depressed sectional portion 4c. Furthermore, when the top portion 4b or the rotation indicator DSP is depressed by the user toward the case with a predetermined pressing force, the pressing force is sensed by a pressure sensing element or the pressure sensing layer THS, and the sensed result is supplied to the system controller 29.

As a result, when the user contacts the jog dial 4 with a predetermined pressing force, the system controller 29 senses the touch and then controls the display of the rotation indicator DSP.

In this embodiment, electrical changes such as variations in resistance of the pressure sensing layer THS formed of a dielectric substance are sensed, thereby sensing the presence or absence of the user contacting with the jog dial 4. However, the presence or absence of the user contacting with the jog dial 4 may be sensed using a mechanical switch having a normally open contact or normally closed contact. Furthermore, it is also possible to use a capacitance sensor for sensing variations in capacitance caused by the user touching the jog dial 4.

Now, referring to FIG. 5, described below is the configuration of the disc playback unit 15 which is provided inside the audio editing apparatus 1.

In FIG. 5, at the aforementioned clamping position, provided are the spindle motor 16 for rotating an optical disc 13 in the predetermined direction and a pickup 17 for optically reading data on the optical disc 13 and delivering the resulting read signal. Also provided is a servo mechanism 18 which moves the pickup 17 back and forth in the radial direction of the optical disc 13 and simultaneously performs servo control thereon for proper optical reading operations.

Furthermore, the disc playback unit 15 is provided with an RF amplifier unit 19 and a pickup servo circuit 20. When the RF amplifier unit 19 generates error signals such as a focus error signal FE or a tracking error signal TE from the read signal delivered by the pickup 17, the pickup servo circuit 20 performs feedback control on the servo mechanism 18 in order to prevent errors such as a focus error or tracking error. The pickup servo circuit 20 controls the operation of the servo mechanism 18 in order to move the pickup 17 to a record track of the optical disc 13 in accordance with the instruction provided by the system controller 29.

The RF amplifier unit 19 generates an RF signal DRF from the data stored on the optical disc 13 in accordance with a read signal delivered by the pickup 17 and then supplies the RF signal DRF to an audio data decoding unit 21 and a control data decoding unit 22.

The audio data decoding unit 21 decodes the RF signal DRF in accordance with the format specified for each optical disc in order to separately extract an audio stream DAS contained in the RF signal DRF and then supply the audio stream DAS to a decompressing unit 23. Then, the decompressing unit 23 decompresses the audio stream DAS which is compressed in accordance with the standards such as MPEG, AC-3, or MP3, and then supplies the resulting decompressed playback data DAU1 to the batch processing unit 24.

The control data decoding unit 22 decodes the RF signal DRF in accordance with the format specified for each optical disc 13 in order to separately extract control data Dc contained in the RF signal DRF and then supply the control data Dc to the batch processing unit 24, a spindle servo circuit 25, and the system controller 29.

At this stage, various control data such as sync data and sub-code data which are stored inclusively in the audio stream DAS as the control data Dc are separately extracted. The sub-code data DSB are supplied to the batch processing unit 24, the sync data are supplied to the spindle servo circuit 25, and all the control data Dc are supplied to the system controller 29.

The spindle servo circuit 25 detects an error in sync data on the rotational speed of the spindle motor 16 provided by the instruction of the system controller 29, and then performs feedback control on the rotation of the spindle motor 16 to prevent the error.

The batch processing unit 24 associates the sub-code data DSB supplied from the control data decoding unit 22 with the playback data DAU1 supplied from the decompressing unit 23 to generate pack data DPAK having a predetermined data structure. Then, the batch processing unit 24 generates new information (hereinafter referred to as "bit density data"), called "bit density", in accordance with the pack data DPAK. Furthermore, the batch processing unit 24 allows the ring buffer memory 32, described later, to store the pack data DPAK therein, and while performing so-called batch processing under the control of the system controller 29, reads the pack data DPAK in the ring buffer memory 32 to supply as playback data DAU2 the playback data DAU1 contained in the retrieved pack data DPAK to the audio editing unit 26. The batch processing unit 24 performs the so-called batch processing, thereby substantially making the processing in the audio editing unit 26 independent of the processing for playback of the playback data DAU1 and control data Dc on the optical disc 13.

The audio editing unit 26 performs the aforementioned various modulations on the playback data DAU2 supplied from the batch processing unit 24, thus performing effects processing (editing processing) for providing the playback data DAU2 with various sound effects. In this context, suppose that the user manipulates the manipulation keys 7a–7f, 8a, 8b and the jog dial 4, shown in FIG. 1(a), to instruct a desired modulation method. In this case, the audio editing unit 26 modulates the playback data DAU2 in response to the instructed modulation method to perform the effects processing for providing various imitation sounds, and then supplies the resulting data (hereinafter referred to as the effects data) DEF to the audio signal generating unit 27.

The audio signal generating unit 27 delivers the effects data DEF as in the digital form. Alternatively, an A/D converter (not shown) converts the effects data DEF to an analog audio signal having the audio frequency band to deliver the resulting signal to audio output terminals 28. Finally, a speaker or headphone connected to the audio output terminals 28 provides playback of the sound.

The system controller 29 comprises a microprocessor (MPU) to execute the pre-set system program, thereby providing centralized control on the operation of the entire audio editing apparatus 1.

The system controller 29 also receives sensed data STHS delivered from the pressure sensing layer THS shown in FIG. 4. In addition, the system controller 29 supplies display data SDSP to the rotation indicator DSP provided on the jog dial 4.

The system controller 29 is connected with the display unit 3, the memory card slot 10, and the manipulation unit 30. In addition to controlling the display of the display unit 3, the system controller 29 transfers data to and from a memory card inserted into the memory card slot 10. Furthermore, the system controller 29 receives instruction data from the manipulation keys 5a–5h, 6a–6f, 7a–7f, 8a, 8b, which are provided on the manipulation unit 30, to control the disc playback unit 15 in response to the instruction data. The system controller 29 is also connected with an angular velocity detecting unit 31 which comprises a rotary encoder circuit (not shown) for detecting the rotational direction and rotational speed (angular velocity) of the jog dial 4.

The angular velocity detecting unit 31 optically detects the rotational direction and speed of the jog dial 4 by means of the rotary encoder circuit and supplies the detected data Sθ to the system controller 29. This allows the system controller 29 to identify the amount of manipulation of the jog dial 4 (the rotational direction and angular velocity) which has been provided by the user through hand operations, and then command the audio editing unit 26 to perform effects processing in response to the amount of manipulation.

Furthermore, the system controller 29 checks one by one the sensed data STHS from the aforementioned pressure sensing layer THS and the detected data SO from the angular velocity detecting unit 31. Upon determining that the jog dial 4 has been rotated with a predetermined pressing force being applied thereto, the system controller 29 controls the read address and read timing of the pack data DPAK stored in the ring buffer memory 32, described later, in response to the rotational direction and angular velocity of the jog dial 4 which have been detected by the angular velocity detecting unit 31.

That is, after having determined that a predetermined pressing force has been applied to the jog dial 4, the system controller 29 temporarily fixes the read address of the pack data DPAK stored in the ring buffer memory 32. Then, with respect to the read address fixed, the system controller 29 increments or decrements the read address in response to the rotational direction of the jog dial 4 as well as varies the read timing in response to the angular velocity of the jog dial 4.

In response to the rotational direction and angular velocity of the jog dial 4, the pack data DPAK are thus retrieved from the ring buffer memory 32 and supplied to the audio editing unit 26 and the audio signal generating unit 27, thereby varying the tone of the playback sound in response to the rotational direction and angular velocity of the jog dial 4.

Furthermore, suppose that the system controller 29 checks one by one the sensed data STHS from the pressure sensing layer THS and the detected data SO from the angular velocity detecting unit 31, leading to the determination that the jog dial 4 at rest has been rotated without being applied with a predetermined pressing force. In this case, with respect to the read address and the read timing at which the pack data DPAK are read from the ring buffer memory 32 while the jog dial 4 is at the standstill, the system controller 29 changes the read address and the read timing, which have been referenced, in response to the rotational direction and angular velocity of the jog dial 4.

That is, the system controller 29 sequentially increases the read address in the ring buffer memory 32 at the predetermined read timing to produce normal playback sounds when the jog dial 4 is at rest without being manipulated. Then, when the jog dial 4 at rest is rotated without being applied by a predetermined pressing force, the system controller 29 increments or decrements the read address with respect to the read address immediately before the rotation in response to the rotational direction of the jog dial 4. In addition, the system controller 29 makes the previous read timing faster or slower than before by the angular velocity of the jog dial 4. This allows the bit bend.

Furthermore, as detailed later, when shortage of the pack data DPAK stored in the ring buffer memory 32 is found, the system controller 29 commands the pickup servo circuit 20 and the spindle servo circuit 25 to move the pickup 17, and then performs control for retrieving update data from the optical disc 13 in order to update the pack data DPAK. Then, the system controller 29 instructs the batch processing unit 24 to generate new pack data DPAK from the update data and the ring buffer memory 32 to store the pack data DPAK therein. This prevents discontinuous playback sounds from being generated.

Now, referring to FIGS. 6 and 7(a) through 7(c), the configuration of the batch processing unit 24 is described below.

Figure 6:
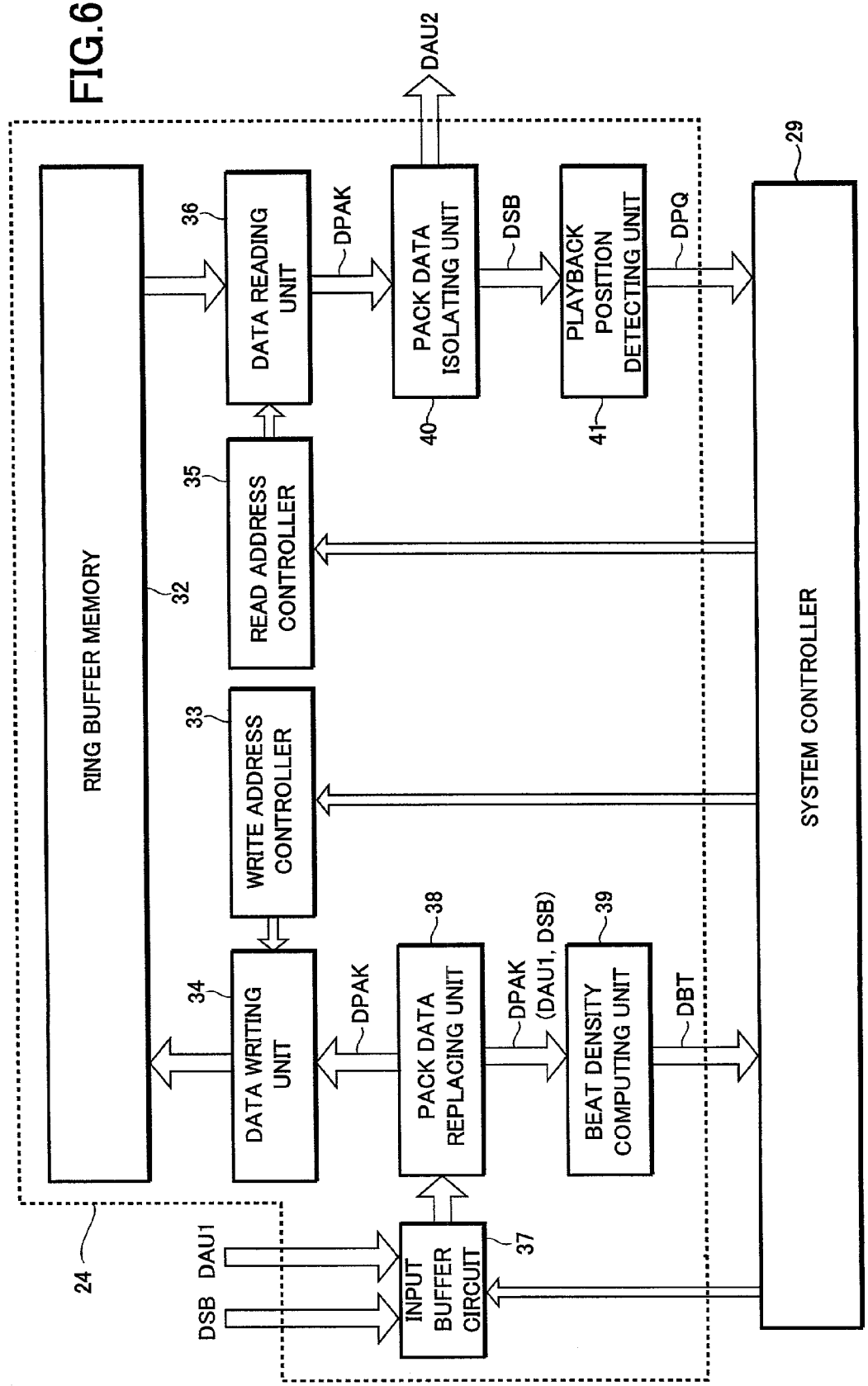
FIG. 6 is a block diagram illustrating the configuration of the batch processing unit.

In FIG. 6, the batch processing unit 24 comprises the ring buffer memory 32 formed of a non-volatile semiconductor memory and provided with a predetermined memory capacity; a write address controller 33 for setting the write address specified by the system controller 29; and a data writing unit 34 for writing the pack data DPAK to the address in the ring buffer memory 32 which is set by the write address controller 33. The batch processing unit 24 further comprises a read address controller 35 for setting the read address specified by the system controller 29; and a data reading unit 36 for reading the pack data DPAK from the address in the ring buffer memory 32 which is set by the read address controller 35.

For example, the ring buffer memory 32 is formed of a 64 Mbyte SDRAM, and has a data storage region from a logical head address AFW to a logical end address ABW. The data storage region is assigned a front region F, a main memory region M, a rear region R, and a general-purpose region NULL, as shown in FIG. 7(b). The front region F comprises two regions FA, FB for storing n pieces of pack data DPAK therein, respectively. The rear region R comprises two regions RA, RB for storing n pieces of pack data DPAK therein, respectively. The main storage region M is set at a storage capacity for storing a predetermined number m of pack data DPAK therein. The general-purpose region NULL is set at a storage capacity for storing a given number of pack data DPAK therein.

The ring buffer memory 32 is handled as an endless memory with the logical head address AFW being coupled to the logical end address ABW. Thus, as shown in FIG. 7(c), the ring buffer memory 32 is logically structured such that the regions RB and FA are located on both sides of the general-purpose region NULL, and the main storage region M is interposed between the regions FB and RA. The ring buffer memory 32 is adapted to store the pack data DPAK therein and then read it under the control of the address controllers 33, 35, the data writing unit 34, and the data reading unit 36 so as not to destroy this logic structure.

That is, addresses are set relatively to the regions F, M, R, and NULL on the precondition of not destroying the logic structure shown in FIGS. 7(b) and (c) to store the pack data DPAK therein. However, no pack data DPAK are stored in the general-purpose region NULL, which is adapted to function as a buffer region.

Furthermore, the batch processing unit 24 comprises a pack data replacing unit 38 for receiving the sub-code data DSB from the control data decoding unit 22 and the playback data DAU1 from the decompressing unit 23, both the data being shown in FIG. 6, via an input buffer circuit 37 at a predetermined timing in accordance with the instruction from the system controller 29.

As shown in FIG. 7(a), the pack data replacing unit 38 generates pack data DPAK which associate the sub-code data DSB with the playback data DAU1 corresponding to the sub-code data DSB. That is, the pack data replacing unit 38 detects the Q-channel data indicative of the elapsed track time of the playback data DAU1 from the sub-code data DSB to associate the playback data DAU1 corresponding to the detected Q-channel data with the sub-code data DSB, thus exchanging data to generate the pack data DPAK shown in FIG. 7(a). Then, the pack data replacing unit 38 supplies the sequentially formed pack data DPAK to the data writing unit 34 and allows the ring buffer memory 32 to store the pack data DPAK therein.

Furthermore, the pack data replacing unit 38 supplies the pack data DPAK to a beat density computing unit 39.

The beat density computing unit 39 comprises a band-pass filter, a peak-level detecting unit, a waveform shaping unit, a time window setting unit, a counter unit, and a beat position detecting unit, all of which are not shown. Here, the band-pass filer is made up of three digital filters having three frequency bands or a high, medium, and low frequency bands, respectively, into which the audio frequency band has been divided.

The playback data DAU1 contained in the pack data DPAK passes through the band-pass filer. This allows the low, medium, and high frequency band components of the playback data DAU1 to be extracted and the peak-level detecting unit to detect the peak of each frequency band component. Furthermore, as binary logical data, the waveform shaping unit shapes the waveforms of the low, medium, and high frequency band components, each peak of which has been detected. The counter unit counts each of the logical data at the predetermined time intervals which are set by the time window setting unit. Then, the count of the low, medium, and high frequency bands, which has been counted at the predetermined time intervals, is determined as a low frequency band beat density DfL, a medium frequency band beat density DfM, and a high frequency band beat density DfH, respectively. Then, the densities are multiplied by predetermined coefficients βL, βM, βH, respectively, and summed to obtain (βL×DfL)+(βM×DfM)+(βH×DfH), which is defined as a beat density DBT of the playback data DAU1. The beat position detecting unit then detects the elapsed track time from the Q-channel data in the sub-code data DSB contained in the pack data DPAK, and then supplies the elapsed track time and the beat density DBT, which have been associated with each other, to the system controller 29. The system controller 29 then supplies the aforementioned elapsed track time and the beat density DBT to the display unit 3 to allow the beat density DBT to be displayed corresponding to the elapsed track time, thereby providing the use with the beat density of playback sounds which are played back on a speaker.

Furthermore, the aforementioned data reading unit 36 is followed by a pack data isolating unit 40 and a playback position detecting unit 41.

The pack data isolating unit 40 is supplied with the pack data DPAK which have been read from the ring buffer memory 32 through the data reading unit 36 in order to separate the sub-code data DSB and the playback data DAU1 which are contained in the pack data DPAK. Then, the pack data isolating unit 40 supplies the sub-code data DSB to the playback position detecting unit 41 and supplies the playback data DAU1 as the playback data DAU2 for generating a playback sound to the audio editing unit 26 shown in FIG. 5.

The playback position detecting unit 41 extracts the Q-channel data from the sub-code data DSB, thereby detecting the elapsed track time at the point in time (the current point in time) at which the playback data DAU2 is processed at the audio editing unit 26 and the audio signal generating unit 27, and then finally played back as a playback sound at a speaker or headphone. The playback position detecting unit 41 then supplies the detected elapsed track time data DPQ to the system controller 29.

Now, the operation of the audio editing apparatus 1 having such a configuration is described below with reference to FIGS. 8 to 13(b). Here, FIGS. 8 and 9 are explanatory flowcharts illustrating the operation of the audio editing apparatus 1, and FIGS. 10(a) to 13(b) are explanatory flowcharts illustrating the operation of the ring buffer memory.

Figure 8:
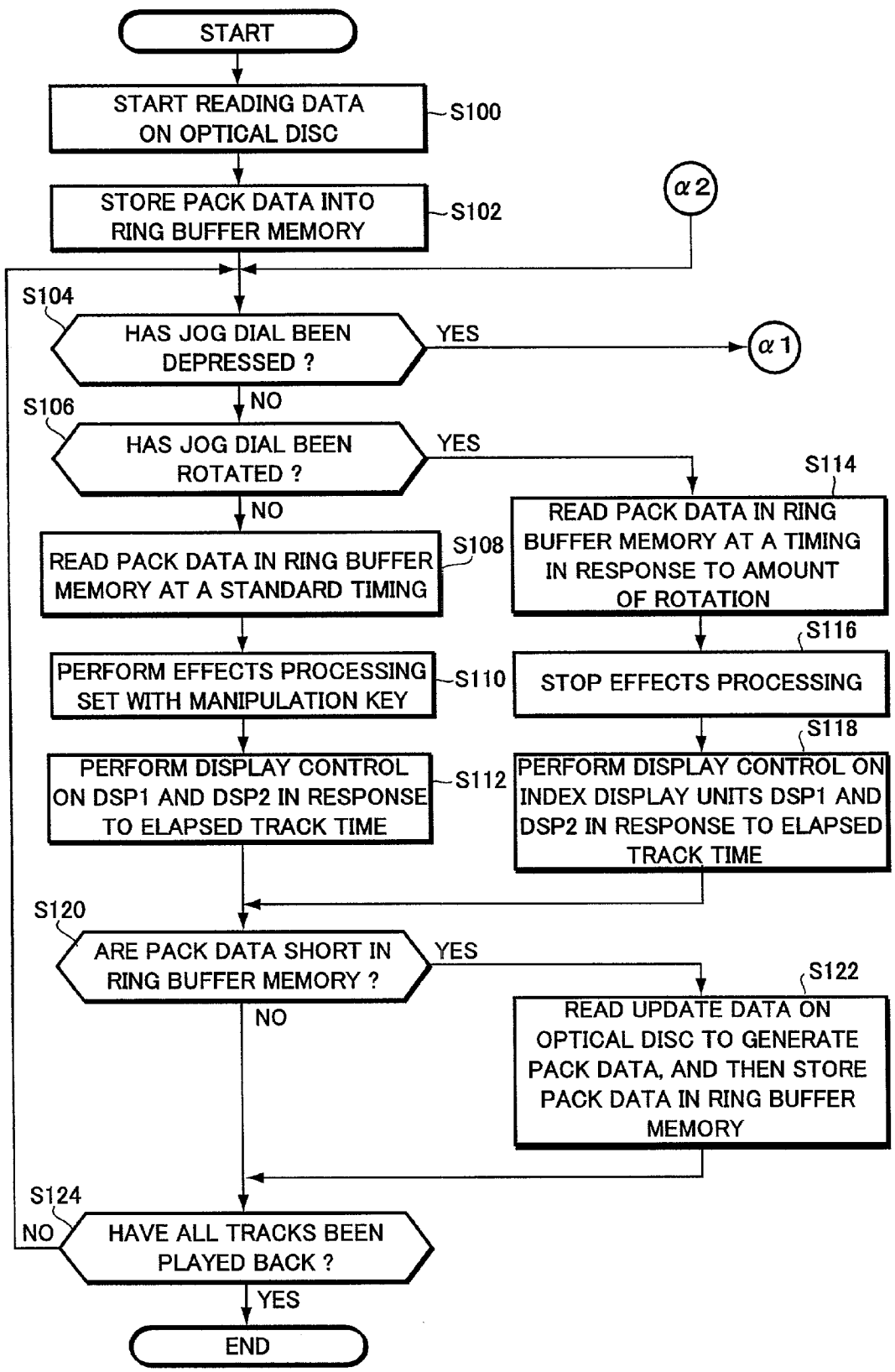
FIG. 8 is an explanatory flowchart illustrating the operation of the audio editing apparatus.
Figure 9:
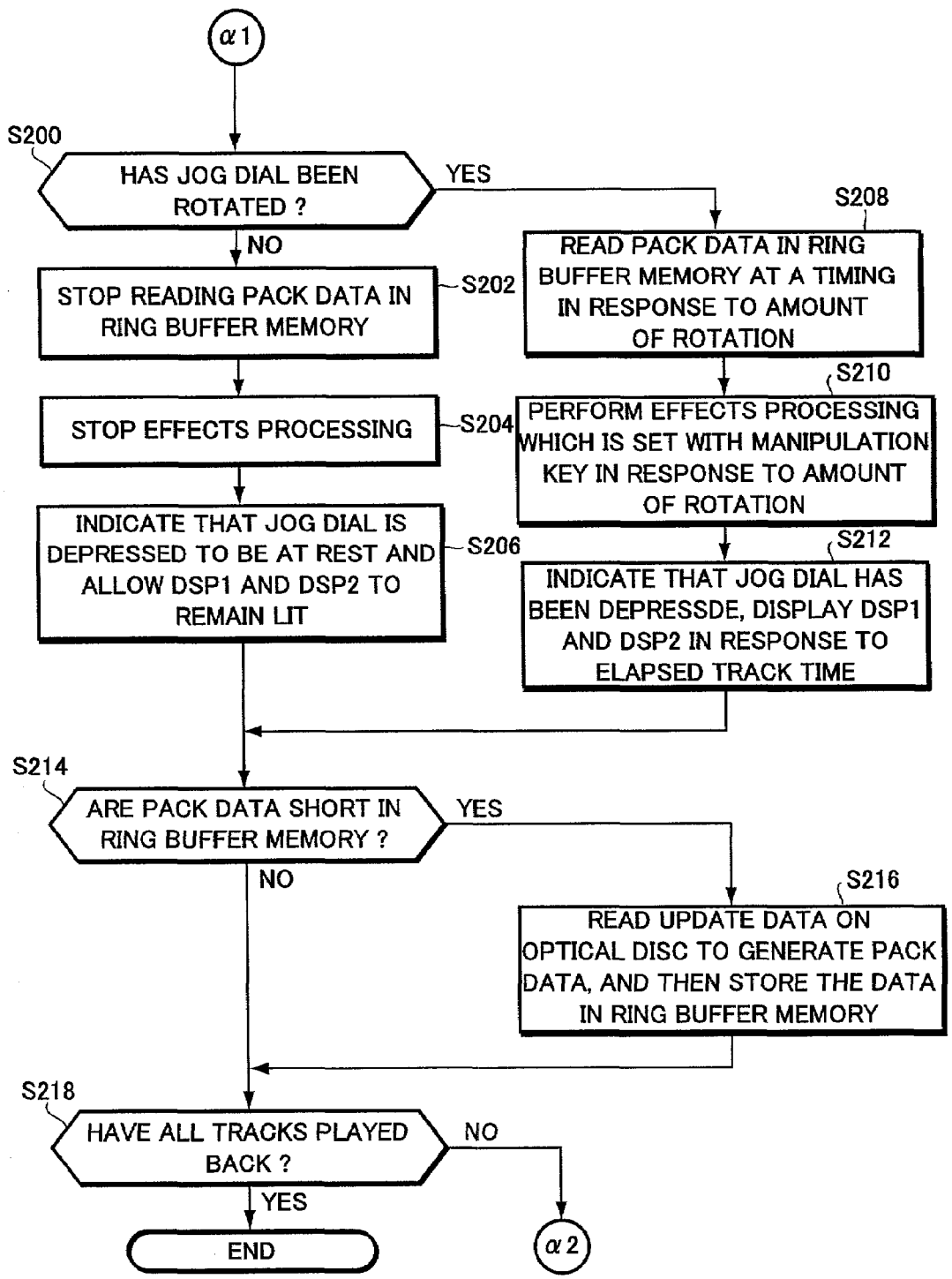
FIG. 9 is another explanatory flowchart illustrating the operation of the audio editing apparatus.

In FIG. 8, the user inserts an optical disc 13 into the disc inlet 14 and then the manipulation unit 30 provides an instruction for initiating playback. This causes the disc playback unit 15 to initiate playback operations under the control of the system controller 29.

First, at step S100, the spindle motor 16 and the pickup 17 are activated to start reading data on the optical disc 13.

Figure 7:
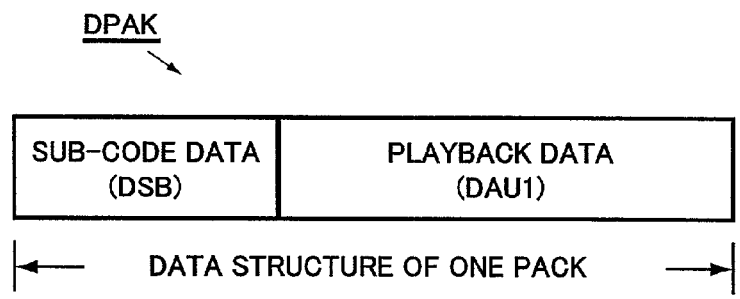
FIG. 7(a) through 7(c) are views illustrating the configuration of a ring buffer memory provided in the batch processing unit.
Figure 7:
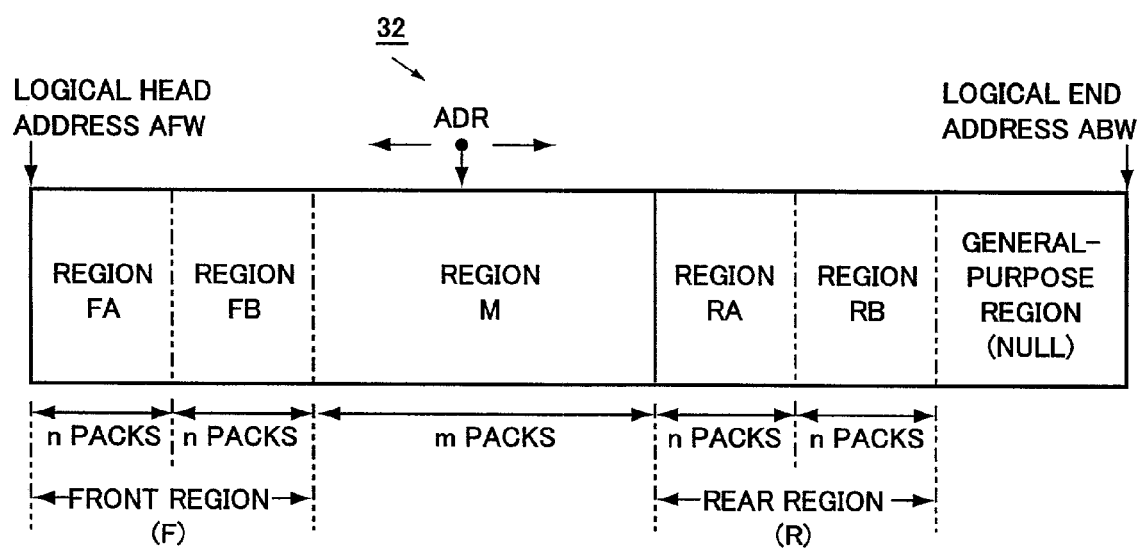
Figure 7:
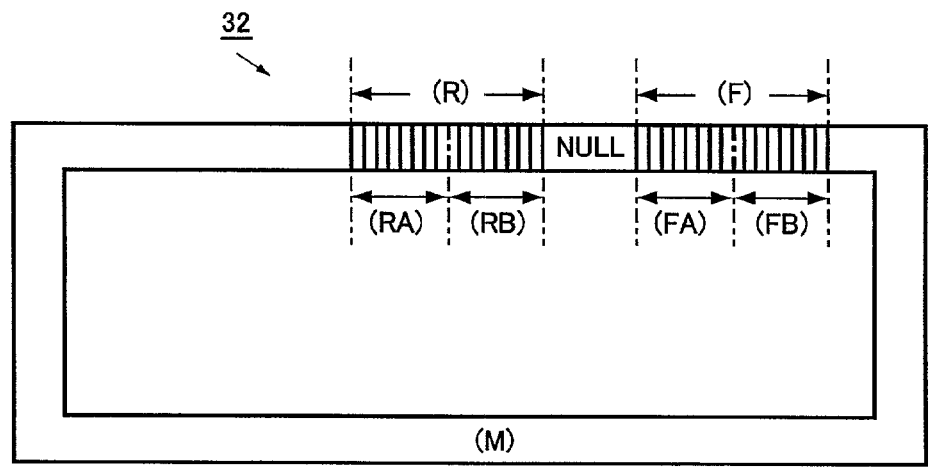

Then, at step S102, the pack data replacing unit 38 generates the pack data DPAK which associates the sub-code data DSB with the playback data DAU1 which are contained in the pieces of data which are sequentially retrieved, and then sequentially stores the resulting pack data DPAK in the front region F and the main storage region M of the ring buffer memory 32. More specifically, as shown in FIG. 7(*b*), (2×n+m+2×n) pieces of pack data DPAK are stored from the aforementioned region F to the rear region R.

Furthermore, upon storing the pack data DPAK sequentially in the ring buffer memory 32, the beat density DBT is generated and supplied to the system controller 29 as well as the system controller 29 supplies the beat density DBT to the display unit 3 for display.

Then, the process checks at step S104 whether the jog dial 4 has been depressed with a predetermined pressing force. If not, then the process checks at step S106 whether the jog dial 4 has been rotated. If not, the process proceeds to step S108, whereas if true, the process proceeds to step S114.

That is, when the user has not touched the jog dial 4 or has touched the jog dial 4 only with a force weaker than the predetermined pressing force without rotating the jog dial 4, the process proceeds to step S108. When the user has rotated the jog dial 4 while touching it with a force weaker than the predetermined pressing force (i.e., when the user has performed the bit bend), the process proceeds to step S114.

If the jog dial 4 has been depressed with the predetermined pressing force at step S104, the process proceeds to step S200, described later, shown in FIG. 9.

At step S108, the system controller 29 specifies the read address in the ring buffer memory 32, and then reads the pack data DPAK located at the specified read address in the ring buffer memory 32. In this step, the system controller 29 checks the first previous elapsed track time data DPQ which are supplied by the playback position detecting unit 41 in order to determine the subsequent read address which is to be specified. Then, the system controller 29 instructs the address controller 35 to set the determined read address in order to read the pack data DPAK from the ring buffer memory 32 via the data reading unit 36. In addition, the system controller 29 provides access to the ring buffer memory 32 at the standard playback time intervals which are specified for each optical disc 13, thereby reading the pack data DPAK.

Then, at step S110, the pack data isolating unit 40 separates the playback data DAU1 and the sub-code data DSB from the pack data DPAK which have been retrieved, followed by supplying the playback data DAU1 to the audio editing unit 26 as the playback data DAU2 for generating a playback sound and supplying the sub-code data DSB to the playback position detecting unit 41.

This allows the audio editing unit 26 to perform effects processing on the playback data DAU2 in accordance with the modulation method which is specified with the manipulation keys 7*a*–7*f*, 8*a*, 8*b*, which are provided on the manipulation unit 30. This also allows the audio signal generating unit 27 to deliver an analog audio signal. Furthermore, the playback position detecting unit 41 generates the elapsed track time data DPQ from the Q-channel data in the sub-code data DSB in order to supply the resulting data to the system controller 29.

Then, at step S112, the system controller 29 causes the rotation indicating region X of the first display unit DSP1 provided on the rotation indicator DSP and the sector display region Y of the second display unit DSP2 to be lit in response to the elapsed track time data DPQ. Such display control on the rotation indicating region X of the first display unit DSP1 provides the user with a feeling of operation as provided by looking at an analog record disc rotating in the forward rotational direction. Furthermore, the sector display region Y of the second display unit DSP2 displays in analog form the amount of remaining data which has not been played back.

At steps S108 to S112, the jog dial 4 is at rest. Playback sounds are therefore to be generated in accordance with the standard playback timing which is specified for each optical disc 13.

On the other hand, when the process has proceeded from step S106 to step S114, the system controller 29 specifies a read address in the ring buffer memory 32 at step S114 and then reads the pack data DPAK located at the specified read address in the ring buffer memory 32. In this step, the system controller 29 checks the first previous elapsed track time data DPQ which are supplied by the playback position detecting unit 41 in order to determine the subsequent read address which is to be specified. Then, the system controller 29 instructs the address controller 35 to set the determined read address in order to read the pack data DPAK in the ring buffer memory 32 via the data reading unit 36. In addition, the system controller 29 provides access to the ring buffer memory 32 at the timing in response to the amount of rotation (the rotational direction and angular velocity) of the jog dial 4, thereby reading the pack data DPAK.

Then, at step S116, the pack data isolating unit 40 separates the playback data DAU1 and the sub-code data DSB from the pack data DPAK which have been retrieved, followed by supplying the playback data DAU1 to the audio editing unit 26 as the playback data DAU2 for generating a playback sound and by supplying the sub-code data DSB to the playback position detecting unit 41.

In this step, however, the audio editing unit 26 stops the effects processing as well as the audio signal generating unit 27 stops delivering the analog audio signal. Furthermore, the playback position detecting unit 41 generates the elapsed track time data DPQ from the Q-channel data in the sub-code data DSB in order to supply the resulting data to the system controller 29.

Then, at step S118, the system controller 29 causes the rotation indicating region X of the first display unit DSP1 provided on the rotation indicator DSP and the sector display region Y of the second display unit DSP2 to be lit in response to the elapsed track time data DPQ. In addition, the system controller 29 causes the index display units INDX2 –INDX7 to flash in accordance with the elapsed track time data DPQ which vary in response to the amount of rotation of the jog dial 4.

Such display control on the index display units INDX2 –INDX7 provides the user with a feeling of operation as provided by applying the bit bend to an analog record disc. In addition, control on the rotation indicating region X of the first display unit DSP1 and the sector display region Y of the second display unit DSP2 provides the user with a feeling of operation as provided by looking at an analog record disc, and allows for displaying in analog form the amount of remaining data which has not been played back.

That is, at steps S114 to S118, the process performs the processing which is carried out when the user performs the bit bend on the jog dial 4.

Then, at step S120 after the process has completed step S112 or S118, the system controller 29 determines whether the pack data DPAK stored in the ring buffer memory 32 are short. That is, it is determined whether there will remain pack data DPAK enough to generate playback sounds. This is because reading sequentially the pack data DPAK stored in the ring buffer memory 32 would cause the read address in the ring buffer memory 32 to come close to the logical end address ABW, resulting in insufficient pack data DPAK after having been read sequentially as it is.

If it has been determined that there will remain pack data DPAK sufficient to generate playback sounds in the ring buffer memory 32, then the process proceeds to step S124. If it has been determined that there will lack pack data DPAK stored in the ring buffer memory 32, then the process proceeds to step S122, where the process performs update processing for updating the pack data DPAK stored in the ring buffer memory 32 to new pack data DPAK.

At step S122, the update processing is carried out as follows. For example, as shown in FIGS. 10(a) and 11(a), the pack data DPAK which have been generated from the data retrieved from a range DW1 in the program region of the optical disc 13 are stored in the ring buffer memory 32 which has not yet been updated. When a read address tch1 is to be set in a region RB shown in FIG. 10(a), it is determined that the pack data DPAK are short. That is, it is determined that the pack data DPAK are short when the read address tch1 has become located in the region RB which is close to the logical end address ABW.

Then, the pack data DPAK in the regions RA, RB are allowed to remain unchanged as shown in FIGS. 10(a) and 11(a), while updated as the pack data DPAK in regions FA, FB as shown in FIGS. 10(b) and 11(b). The data which should continuously follow the playback data DAU1 contained in the updated pack data DPAK in the region FB are then read from the optical disc 13 with the pickup 17. The pack data DPAK which have been generated from the data read are overwritten and stored sequentially after the updated region FB. As shown in FIGS. 10(b) and 11(b), this allows for creating an updated main region M and regions RA, RB subsequent to the updated regions FA, FB.

Here, the pack data DPAK in the non-updated regions RA, RB are employed as the pack data DPAK in the updated regions FA, FB. Thus, the pickup 17 reads only the data which allow the pack data DPAK to be stored in the updated main region M and regions RA, RB, or the data within the range DW2 on the optical disc 13 shown in FIG. 10, thereby implementing quick update processing.

The update processing performed as such allows the pack data DPAK in the non-updated regions RA, RB to remain in the updated regions FA, FB. This makes it possible to provide continuous playback sounds without interruption even when the read address controller 35 sequentially sets addresses subsequent to the read address tch1 to generate the playback sounds in accordance with the pack data DPAK which have been read. It is thus made possible to provide playback sounds of good quality.

Figure 10:
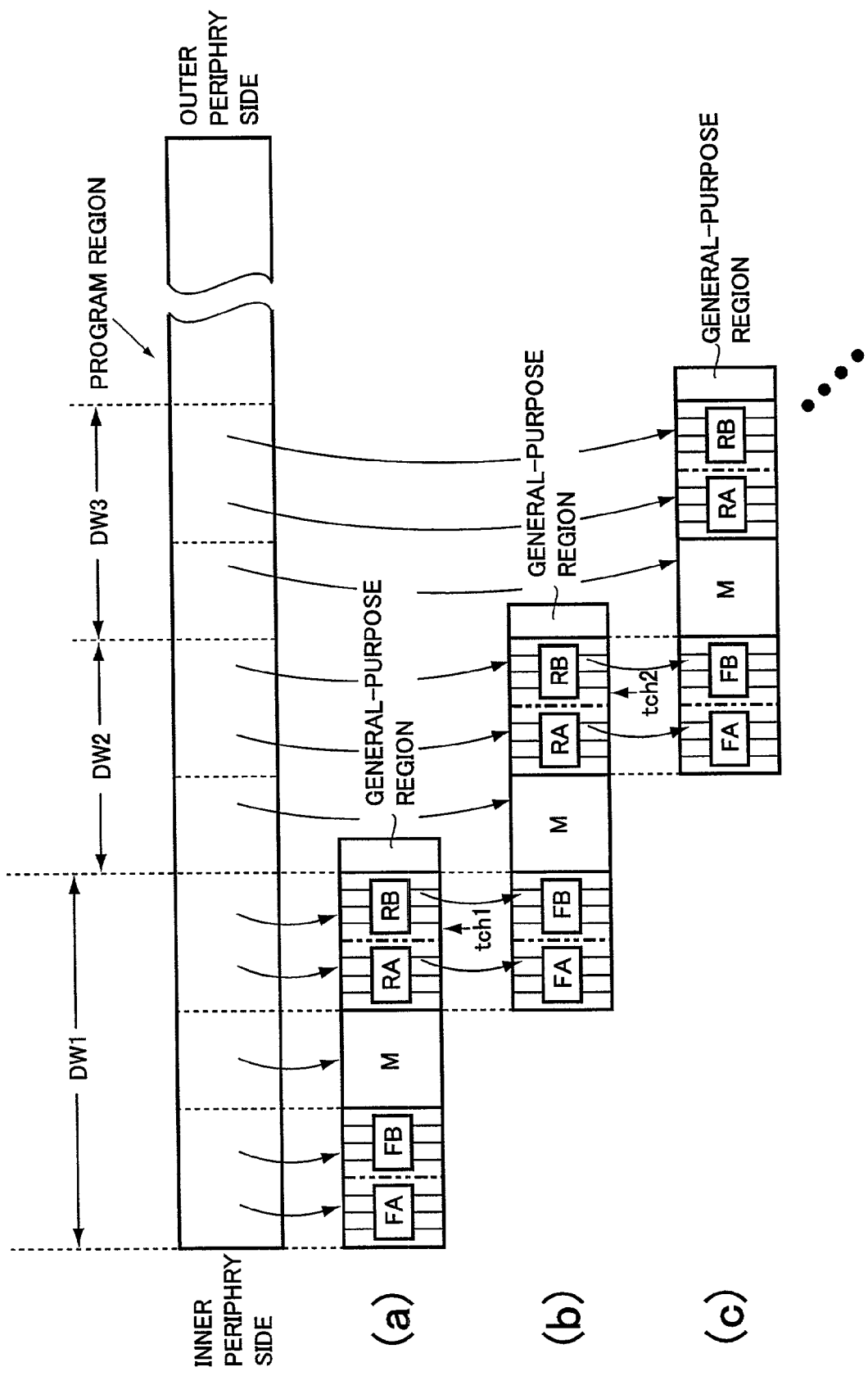
FIGS. 10(a) to 10(c) are explanatory views illustrating the update processing for updating the pack data to be stored in the ring buffer memory.
Figure 11:
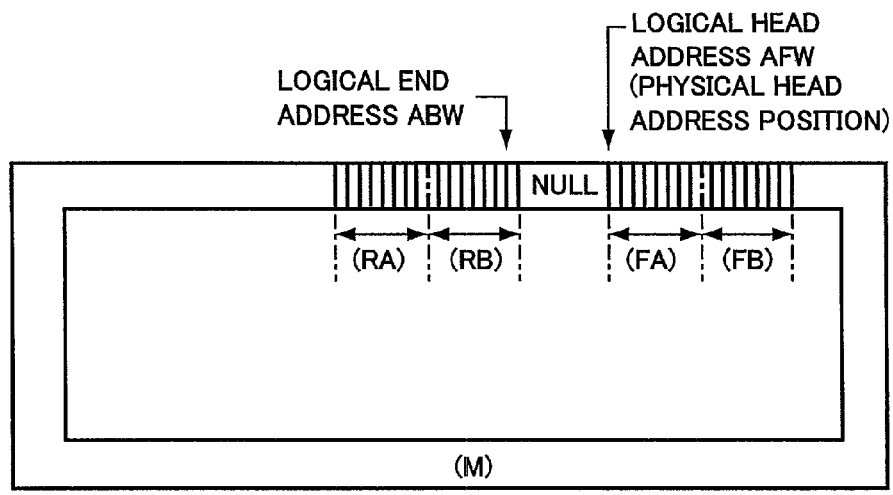
FIGS. 11(a) through 11(c) are other explanatory views illustrating the update processing for updating the pack data to be stored in the ring buffer memory.
Figure 11:
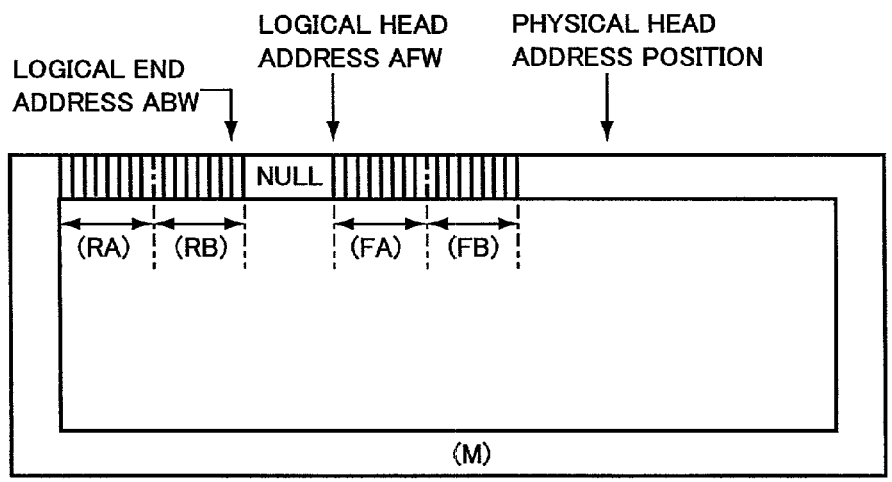
Figure 11:
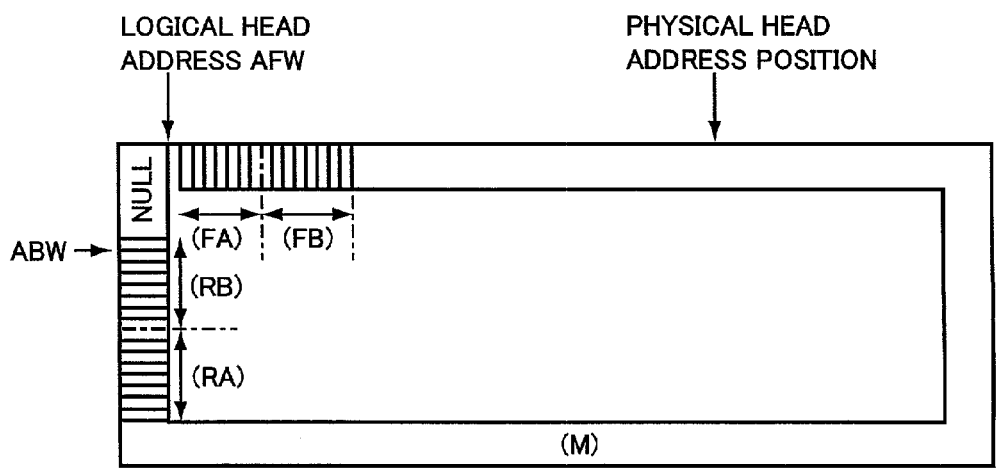
Figure 12:
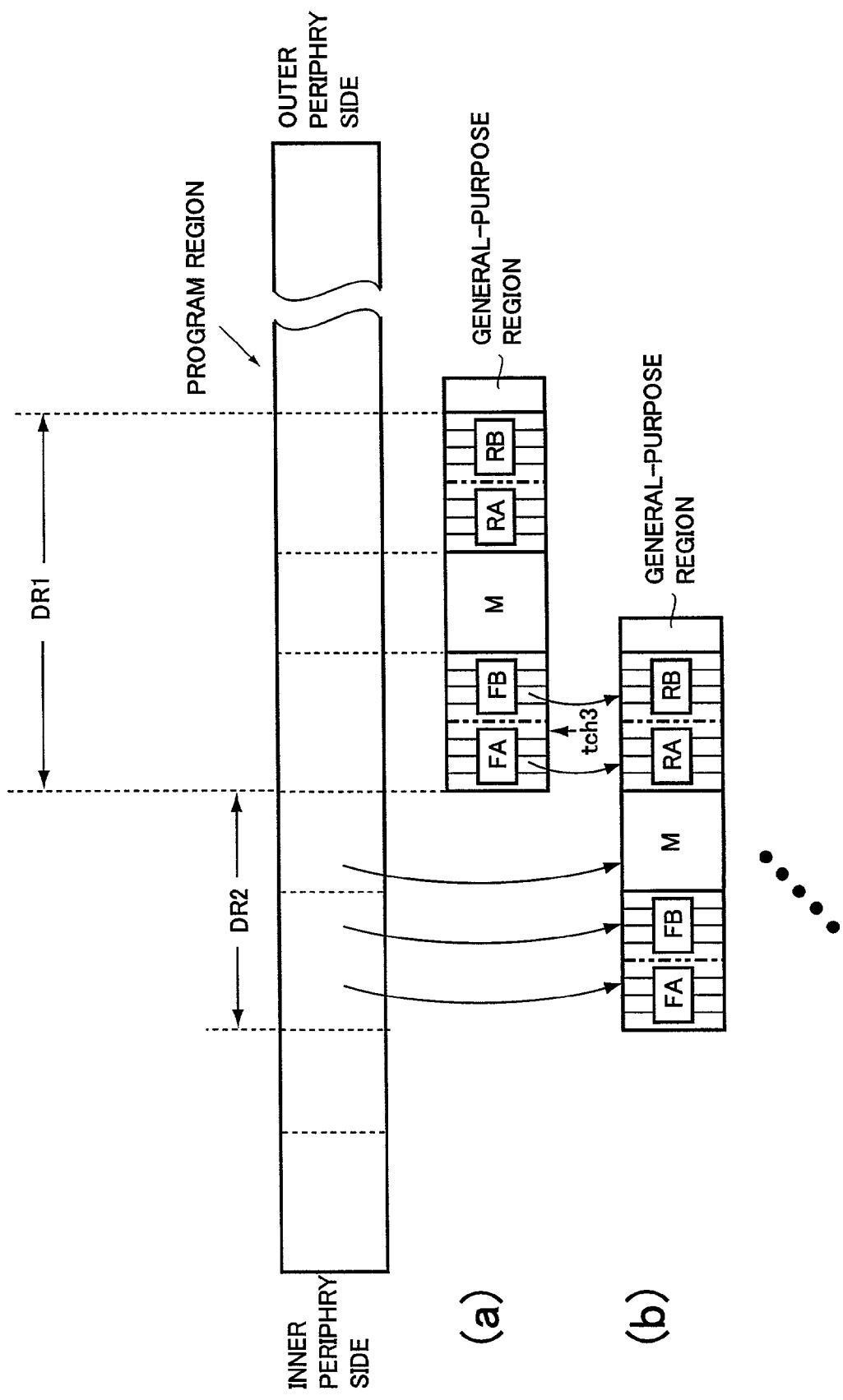
FIGS. 12(a) and 12(b) are still other explanatory views illustrating the update processing for updating the pack data to be stored in the ring buffer memory.
Figure 13:
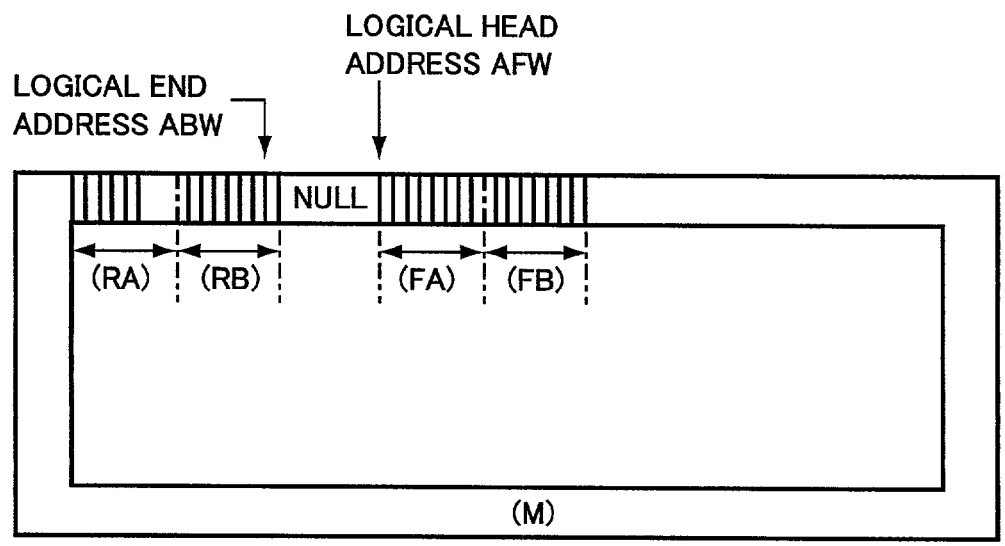
FIGS. 13(a) and 13(b) are yet further explanatory views illustrating the update processing for updating the pack data to be stored in the ring buffer memory.
Figure 13:
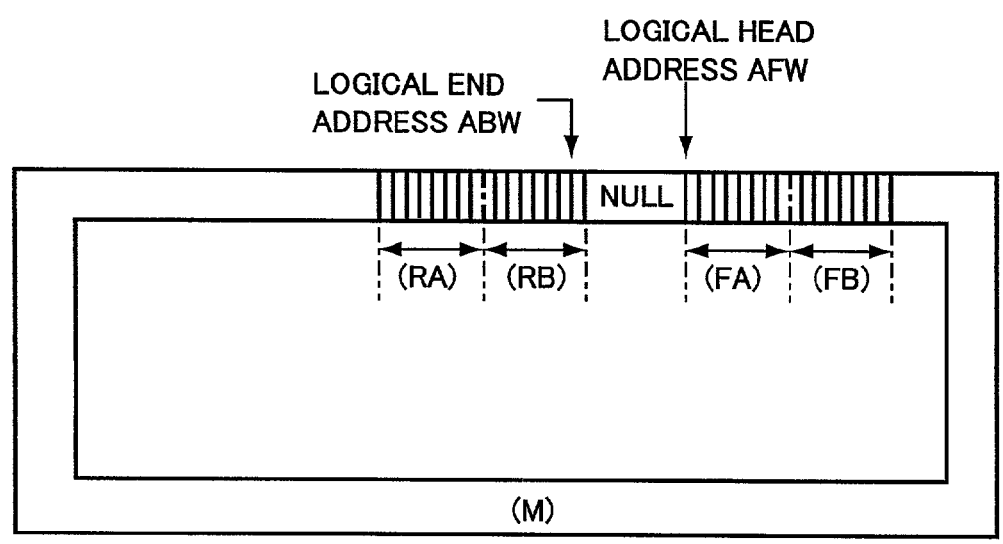

On the other hand, suppose that a read address tch2 is to be set in the region RB shown in FIG. 10(b) after the ring buffer memory 32 has been updated as shown in FIGS. 10(b) and 11(b), resulting in a shortage of the pack data DPAK. In this case, the update processing is carried out in the same way as the state of FIGS. 10(a) and 11(a) is updated to that of FIGS. 10(b) and 11(b). This causes the ring buffer memory 32 to be updated to the state of FIGS. 10(c) and 11(c) from that of FIGS. 10(b) and 11(b). Upon the update to the state of FIGS. 10(c) and 11(c), the pickup 17 reads only the data to be stored in the updated main region M and regions RA, RB, or the data within the range DW3 on the optical disc 13 shown in FIG. 10, thereby implementing quick update processing. The pack data DPAK are allowed to remain in the updated regions FA, FB, thereby making it possible to provide playback sounds of good quality.

After new pack data DPAK have been updated in the ring buffer memory 32 as described above, the process proceeds to step S124.

At step S124, the process determines whether all tracks have been played back. If not, the process repeats the processing from step S104, while if true, the process terminates the processing.

Now, described below is the operation at step S200 of FIG. 9 subsequent to the aforementioned step S104.

At step S200, the process determines whether the jog dial 4 has been rotated. That is, the process determines at step S200 whether the jog dial 4 has been rotated, after it is determined at step S104 in FIG. 8 that the jog dial 4 has been depressed. It is thereby determined whether the jog dial 4 has been depressed but not rotated to be at rest or the jog dial 4 has been rotated while being depressed.

If it has been determined that the jog dial 4 has been depressed but not rotated to be at rest, the process proceeds to the processing at step S202. If it has been determined that the jog dial 4 has been rotated while being depressed, the process proceeds to the processing at step S208.

At step S202, the process stops reading the pack data DPAK in the ring buffer memory 32, while stopping the effects processing in step S204.

Then, at step S206, the process allows the display unit DSP4 to be lit, thereby indicating that the rotation of the jog dial 4 is at rest. In addition, the process allows the display status of the display units DSP1, DSP2 to remain unchanged or in the same status as immediately before the jog dial 4 has been depressed.

As described above, the display unit DSP4 is lit and the display status of the display units DSP1, DSP2 remains unchanged, thereby providing the user with just the same feeling of operation as provided by touching an analog record disc to stop its rotation. Furthermore, the process stops effects processing and delivering playback sounds, thus providing the user with the same feeling of operation as provided by stopping the rotation of an analog record disc to deliver no playback sounds.

On the other hand, at step S208 subsequent to step S200, the effects processing is performed at steps S208 to S212 in response to the amount of rotation (the rotational direction and angular velocity) of the jog dial 4.

First, at step S208, the system controller 29 specifies the read address in the ring buffer memory 32 in response to the amount of rotation (the rotational direction and angular velocity) of the jog dial 4, and then retrieves the pack data DPAK located at the specified read address from the ring buffer memory 32. In this step, the system controller 29 checks the first previous elapsed track time data DPQ which are supplied by the playback position detecting unit 41 in order to determine the subsequent read address which is to be specified. Then, the system controller 29 instructs the address controller 35 to set the determined read address in order to read the pack data DPAK in the ring buffer memory 32 via the data reading unit 36. In addition, the system controller 29 provides access to the ring buffer memory 32 at the timing in response to the amount of rotation (the rotational direction and angular velocity) of the jog dial 4, thereby reading the pack data DPAK.

In this context, for example, suppose that the jog dial 4 is depressed to rotate in the clockwise direction when an address ADR is set in the main region M shown in FIG. 7(b). In this case, the system controller 29 increments the address corresponding to the angular velocity of the jog dial 4 with respect to the address ADR in order to allow the address set by the read address controller 35 to move sequentially toward the logical end address ABW, leading to the state of forward playback. Then, the pack data DPAK are read from the address set by the read address controller 35.

On the other hand, when the jog dial 4 is rotated in the counterclockwise direction, the system controller 29 decrements the address corresponding to the angular velocity of the jog dial 4 with respect to the address ADR in order to allow the address set by the read address controller 35 to move sequentially toward the logical head address AFW, leading to the state of reverse playback. Then, the pack data DPAK are read from the address set by the read address controller 35.

When the jog dial 4 is manipulated back and forth in the clockwise and counterclockwise directions, the forward and reverse playback are alternated with respect to the address ADR to increment or decrement the read address with respect to the address ADR, thereby allowing the pack data DPAK to be read.

The storage capacity of each of the regions FA, FB, M, RA, and RB is predetermined so as to allow for storing the amount of pack data DPAK greater than the amount corresponding to a typical maximum angle of rotation at which the user manipulates the jog dial 4 back and forth in the clockwise and counterclockwise directions. It is therefore possible to read the pack data DPAK stored in the ring buffer memory 32 in response to the rotation of the jog dial 4.

Then, at step S210, the pack data isolating unit 40 separates the playback data DAU1 and the sub-code data DSB from the pack data DPAK which have been retrieved, followed by supplying the playback data DAU1 to the audio editing unit 26 as the playback data DAU2 for generating a playback sound and by supplying the sub-code data DSB to the playback position detecting unit 41.

As a result, the audio editing unit 26 performs the effects processing specified with the manipulation keys 7a 7f, 8a, 8b and associated with the amount of rotation of the jog dial 4, while the audio signal generating unit 27 delivers an analog audio signal.

That is, when the jog dial 4 is rotated in the clockwise direction, a modulated imitation sound is delivered in accordance with the playback data DAU2 which have been read in the forward direction in response to the rotational speed. On the other hand, when the jog dial 4 is rotated in the counterclockwise direction, a modulated imitation sound is delivered in accordance with the playback data DAU2 which have been read in the reverse direction in response to the rotational speed. When the jog dial 4 is manipulated back and forth in the clockwise and counterclockwise directions, a modulated imitation sound (scratching sound) is delivered in accordance with the playback data DAU2 which have been read in the forward and reverse directions in response to the rotational speed.

Furthermore, the playback position detecting unit 41 generates the elapsed track time data DPQ from the Q-channel data in the sub-code data DSB in order to supply the resulting data to the system controller 29.

Then, at step S212, the system controller 29 causes the display unit DSP4 to be lit, thereby indicating that the jog dial 4 is being depressed. The system controller 29 further causes the rotation indicating region X of the display unit DSP1 provided on the rotation indicator DSP and the sector display region Y of the display unit DSP2 to be lit in response to the elapsed track time data DPQ.

Through the processing at steps S208 to S212 carried out as described above, delivered is an imitation sound in response to the amount of rotation of the jog dial 4 provided by the user. In particular, a scratching sound is generated and delivered through back and forth manipulations on the jog dial 4.

On the other hand, the display unit DSP4 is lit, thereby providing the user with a feeling of operation as provided by manipulating an analog record disc through hand operations while depressing it. Furthermore, the display control on the rotation indicating region X of the display unit DSP1 and the sector display region Y of the display unit DSP2 provides the user with a feeling of operation as provided by looking at an analog record disc as well as indicates the amount of remaining data which has not been played back.

Then, at step S214 after the process has completed the processing at step S106 or S212, the system controller 29 determines whether the pack data DPAK stored in the ring buffer memory 32 are short. That is, it is determined whether there will remain pack data DPAK enough to generate playback sounds. This is because reading sequentially the pack data DPAK stored in the ring buffer memory 32 would cause the read address in the ring buffer memory 32 to come close to the logical end address ABW, resulting in insufficient pack data DPAK after having been read sequentially as it is.

If it has been determined that there will remain pack data DPAK sufficient to generate playback sounds in the ring buffer memory 32, then the process proceeds to step S218. If it has been determined that there will lack pack data DPAK stored in the ring buffer memory 32, then the process proceeds to step S216, where the process performs update processing for updating the pack data DPAK stored in the ring buffer memory 32 to new pack data DPAK.

The update processing is performed at step S216 in the same way as at step S122 in FIG. 8 which has been described with reference to FIGS. 10(a) and 11(c).

The description of step S122 in FIG. 8 has referred to the update processing performed upon forward playback. However, when the jog dial 4 is rotated in the counterclockwise direction to provide reverse playback resulting in the shortage of the pack data DPAK stored in the ring buffer memory 32, the update processing is performed as follows.

That is, as shown in FIGS. 12(a) and 13(a), when the pack data DPAK which have been generated from the data within a range DR1 of the program region on the optical disc 13 are stored in the ring buffer memory 32 and a read address tch3 comes closer to the region FA near the logical head address AFW, the update processing for reverse playback is performed. As shown in FIGS. 12(b) and 13(b), with the pack data DPAK stored in the regions FA, FB of the front region F being allowed to remain unchanged, the regions FA, FB are set to the regions RA, RB and the general-purpose region NULL is set subsequent to the updated regions RA, RB.

Then, to store the pack data DPAK in the updated regions FA, FB and main region M, the necessary data are read from the range DR2 on the optical disc 13. Subsequently, the pack data DPAK which have been generated from the playback data DAU1 contained in the data and the sub-code data DSB, which have been read, is stored sequentially in addresses subsequent to the general-purpose region NULL. This causes the non-updated ring buffer memory 32 in the state of FIGS. 12(a) and 13(a) to be updated to the state of FIGS. 12(b) and 13(b), also causing the updated regions FA, FB and main region M to be set subsequent to the general-purpose region NULL.

As described above, in the update processing upon reverse playback, the pack data DPAK stored in the regions FA, FB of the front region F are set as the updated regions RA, RB, and only the data which are to be stored in the updated regions FA, FB and main region M is read from the range DR2. It is therefore possible to provide quick update processing just as in the case of the update processing upon forward playback.

As described above, at step S216, the forward or reverse playback is carried out in response to the amount of manipulation of the jog dial 4, while the update processing upon forward playback or reverse playback is performed as required, thereby playing back imitation sounds or so-called scratching sounds. Then, the process proceeds to step S218.

At step S218, the process determines whether all tracks have been played back. If not, the process repeats the processing from step S104 in FIG. 8, while if true, the process terminates the processing.

As described above, in this embodiment, when the user rotates the jog dial 4 while depressing it with a predetermined pressing force, the effects processing is performed in response to the amount of rotation of the jog dial 4. It is therefore possible to provide the user with just the same feeling of operation as provided by operating an analog record disc. Furthermore, the amount of rotation of the jog dial 4 is indicated on the rotation indicator DSP provided on the jog dial 4. Merely looking at the indication, the user is provided with a feeling of effects as provided by looking at the movement of an analog record disc.

Accordingly, upon performing editing processing on playback sounds in various ways using optical discs such as CDs or DVDs, it is possible to provide the user with the same feeling of operation as provided by performing editing processing using an analog record disc.

In this embodiment, such a case has been described in which data stored in a CD or DVD are played back. However, the present invention is not particularly intended to be applicable only to a storage medium, but may be applicable upon playback of information stored on other storage media such as a MD (Mini Disc) or a hard disc as well as upon playback of information stored on a storage medium comprising a solid-stage memory such as a memory card.

AS described above, according to the information playback apparatus of the present invention, the amount of playback information is set in response to the amount of rotation of a rotating body. Accordingly, for example, when rotating the rotating body through hand operations, the user is provided with just the same feeling of operation as provided by rotating an analog record disc through hand operations and thereby setting playback information.

Furthermore, in response to the amount of rotation of the rotating body, the amount of playback of playback information is set to perform processing for providing sound effects. It is therefore possible to provide just the same feeling of operation as provided by rotating an analog record disc through hand operations to provide sound effects.

Furthermore, when it is determined from the amount of rotation detected that the rotating body is at rest, the editing processing for providing sound effects is to be stopped. It is therefore possible to provide the user with just the same feeling of operation as provided by forcefully stopping an analog record disc through hand operations, if the user touches the rotating body without rotating it.

Furthermore, suppose that it has been determined from the amount of rotation detected that the rotating body rotates back and forth in the forward and reverse rotational directions. In this case, performed is the editing processing for providing sound effects in the forward direction in response to the amount of rotation provided by the forward rotation of the rotating body. Also performed is the editing processing for providing sound effects in the reverse direction in response to the amount of rotation provided by the reverse rotation of the rotating body. It is therefore possible to provide the user with just the same feeling of operation as provided by rotating a analog record disc back and forth in the forward and reverse rotational directions to produce a scratching sound.

Furthermore, provided is display device for indicating the amount of rotation of the rotating body in response to the amount of rotation detected. Accordingly, merely looking at the indication on the display device, the user can be provided with just the same feeling of operation as provided by looking at the movement of an analog record disc rotated by the user.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An information playback apparatus for playing back information from an optical disc, comprising:
    an optical pickup for reading information from the optical disc;
    a rotating body provided rotatably,
    a detecting unit for detecting a rotating speed and a rotating direction of the rotating body,
    a sensing unit for sensing a pressure on or a contact with the rotating body;
    a control unit for setting a playback speed and a playback direction of the playback information in response to the rotating speed and the rotating direction detected by the detecting unit when the sensing unit has detected a pressure on or a contact with the rotating body;
    a memory for storing information read by the optical pickup as memory information;
    a judging unit for judging whether the memory information stored in the memory is insufficient;
    wherein:
    the memory stores predetermined ranges of information before and after information to be read out;
    once the judging unit judges that the memory information stored in the memory is insufficient, the optical pickup reads from the optical disc information to be continued with the memory information and stores the read information in the memory.

2. The information playback apparatus according to claim 1, further comprising an editing unit for performing editing processing to provide a sound effect for playback information, the information having the amount set by the control unit.

3. The information playback apparatus according to claim 1, wherein
    when the control unit determines from the amount of rotation detected by the detecting unit that the rotating body is at rest, the control unit stops the editing processing provided by the editing unit.

4. The information playback apparatus according to claim 1, wherein
    when the control unit determines from the amount of rotation detected by the detecting unit that the rotating body is being rotated back and forth in forward and reverse rotational directions, the control unit causes the editing unit to perform editing processing for providing the playback information with a sound effect in a forward direction in response to the amount of rotation in the forward rotational direction and editing processing for providing the playback information with a sound effect in a reverse direction in response to the amount of rotation in the reverse rotational direction.

5. The information playback apparatus according to claim 1, further comprising a display unit for indicating the amount of rotation of the rotating body in response to the amount of rotation detected by the detecting unit.

* * * * *